(12) United States Patent
Irisawa et al.

(10) Patent No.: US 7,683,203 B2
(45) Date of Patent: Mar. 23, 2010

(54) POLYMERIZABLE COMPOUND AND COMPOSITION CONTAINING THE POLYMERIZABLE COMPOUND

(75) Inventors: Masatomi Irisawa, Saitama (JP); Tatsunori Kobayashi, Saitama (JP); Mineki Hasegawa, Tokyo (JP)

(73) Assignee: Adeka Corporation, Tokyo (JP)

( * ) Notice: Subject to any disclaimer, the term of this patent is extended or adjusted under 35 U.S.C. 154(b) by 323 days.

(21) Appl. No.: 11/666,728

(22) PCT Filed: Oct. 31, 2005

(86) PCT No.: PCT/JP2005/019966

§ 371 (c)(1), (2), (4) Date: May 2, 2007

(87) PCT Pub. No.: WO2006/049111

PCT Pub. Date: May 11, 2006

(65) Prior Publication Data

US 2007/0282087 A1 Dec. 6, 2007

(30) Foreign Application Priority Data

Nov. 4, 2004 (JP) ............................ 2004-320298
Jul. 21, 2005 (JP) ............................ 2005-210868

(51) Int. Cl.
C07C 69/76 (2006.01)
C07C 69/94 (2006.01)
C08F 20/20 (2006.01)
C08L 33/04 (2006.01)

(52) U.S. Cl. ............................ 560/95; 560/76; 560/80; 560/83; 560/100; 525/8; 525/81; 525/85; 525/94; 525/222; 526/318.43

(58) Field of Classification Search .............. 560/8, 560/56, 59, 66, 76, 83, 80, 85, 95, 100; 526/242, 526/247, 250, 251, 292.5, 318.43; 428/1.1; 525/8, 81, 85, 94, 222

See application file for complete search history.

(56) References Cited

U.S. PATENT DOCUMENTS

| 4,452,993 A | 6/1984 | Conciatori et al. |
| 2002/0060310 A1 | 5/2002 | Hasebe et al. |
| 2003/0224175 A1 | 12/2003 | Morita et al. |

FOREIGN PATENT DOCUMENTS

| EP | 1 205 467 | 6/1984 |
| JP | 55-33424 | 3/1980 |
| JP | 6-507987 | 9/1994 |
| JP | 9-40585 | 2/1997 |
| JP | 11-116534 | 4/1999 |
| JP | 11-130729 | 5/1999 |
| JP | 11-513360 | 11/1999 |
| JP | 2002-145830 | 5/2002 |
| JP | 2003-315553 | 11/2003 |
| JP | 2004-41129 | 2/2004 |
| JP | 2005-263789 | 9/2005 |
| JP | 2005-309255 | 11/2005 |
| WO | 93/22397 | 11/1993 |

OTHER PUBLICATIONS

English translation by computer for JP 11-130729 (1999), http://www4.ipdl.inpit.go.jp/Tokujitu/PAJdetail.ipdl?N0000=60&N0120=01&N2001=2&N3001=H11-130729.*
European Search Report dated Feb. 17, 2009.

* cited by examiner

Primary Examiner—Shean C Wu
(74) Attorney, Agent, or Firm—Young & Thompson

(57) ABSTRACT

The polymerizable compound of the present invention is represented by general formula (1) below and can provide a composition that is polymerizable near ambient temperature and exists in a liquid crystal phase at low temperatures. The composition and a (co)polymer of the polymerizable compound of the present invention are liquid crystal substances useful as optically anisotropic materials.

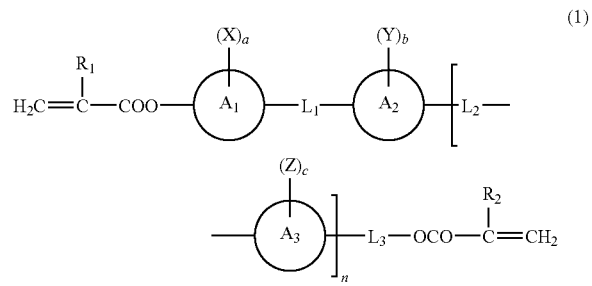

(In the formula, each of rings $A_1$ to $A_3$ represents a benzene ring, cyclohexane ring, etc.; each of X to Z represents a $C_{1-8}$ alkyl or alkoxy group, $C_{2-6}$ alkenyl group, halogen atom, cyano group, or $CH_2=CR_3-COO-$; each of $R_1$ to $R_3$ represents a hydrogen atom, methyl group, or halogen atom; each of $L_1$ to $L_3$ represents $-CH_2CH_2COO-$, $-COO-$, $-OCO-$, $-CH_2CH_2-$, $-O(CH_2)_f-$ (herein, f=1-8), etc.; n represents 0 or 1; and a to c represent such numbers that the polymerizable compound has at least one or more of any of X, Y, and Z).

26 Claims, No Drawings

POLYMERIZABLE COMPOUND AND COMPOSITION CONTAINING THE POLYMERIZABLE COMPOUND

TECHNICAL FIELD

The present invention relates to a new polymerizable compound having a linear array of rings terminated with (meth)acrylic groups connected via different spacers at both ends. In detail, the invention relates to a polymerizable compound that provides, as a cured film formed by polymerizing the (meth)acrylic groups, an optically anisotropic material excellent in heat resistance, solvent resistance, and optical properties. The present invention also relates to a homopolymer, a copolymer, and a composition using the polymerizable compound; and an optically anisotropic material that is a cured product formed from at least one substance selected from the homopolymer, the copolymer, and the composition. The optically anisotropic material is useful for retardation plates, polarization plates, polarizing prisms, various optical filters, and others.

BACKGROUND ART

Recently, liquid crystals have been investigated, besides in application to display media based on reversible movement of liquid crystal molecules such as display elements representatively exemplified by TN-type and STN-type liquid crystals, towards application to optically anisotropic materials for retardation plates, polarization plates, polarizing prisms, various optical filters, and others due to their oriented nature and anisotropy in physical properties such as refractive index, dielectric constant, and magnetic susceptibility.

In order to provide stable and uniform optical properties to such optically anisotropic materials using liquid crystal substances as source components, it is essential to form mechanically and thermally stable polymers with high glass transition temperature (referred to as "Tg" hereinafter) and excellent orientation by semipermanently fixing uniform orientation of the liquid crystal molecules in a liquid crystal state.

As a strategy to semipermanently fix uniform orientation of liquid crystal molecules in a liquid crystal state, it is already known, for example, a method of uniformly orienting a liquid crystalline compound with a polymerizable functional group or a polymerizable liquid crystal composition containing such a compound in its liquid crystal state, followed by photo-polymerizing by irradiation with energy beam such as ultraviolet light while keeping the liquid crystal state to semipermanently fix the is uniform orientation.

As liquid crystalline compounds with polymerizable functional group, (meth)acrylic group-containing polymerizable compounds are known (for example, see Patent Document 1, Patent Document 2, Patent Document 3, Patent Document 4, and Patent Document 5). The temperature at which the polymerizable compounds described in these documents exist in a liquid crystal phase was high, and hence the polymerization-curing had to be conducted at high temperatures.

Since polymerization at a high temperature causes thermal polymerization concurrently with photo-polymerization, the cured products tend to exhibit uneven physical properties, and it is difficult to fix the orientation. Also, for easier temperature control in curing, there has been awaited compounds that provide liquid crystal compositions existing in a liquid crystal phase at lower temperatures.

Patent Document 1: Japanese Patent Laid-Open Publication H9-40585

Patent Document 2: Japanese Patent Laid-Open Publication H11-116534

Patent Document 3: Japanese Patent Laid-Open Publication H11-513360

Patent Document 4: Japanese Patent Laid-Open Publication 2002-145830

Patent Document 5: Japanese Patent Laid-Open Publication 2004-041129

DISCLOSURE OF THE INVENTION

Problems to be Solved by the Invention

An object of the present invention is to provide a new polymerizable compound that exhibits excellent orientation behavior and exists in a liquid crystal phase at lower temperatures; and a composition containing the polymerizable compound.

Means for Solving Problems

The present invention achieves the object by providing a polymerizable compound represented by general formula (1) below and a composition containing the polymerizable compound.

[Formula 1]

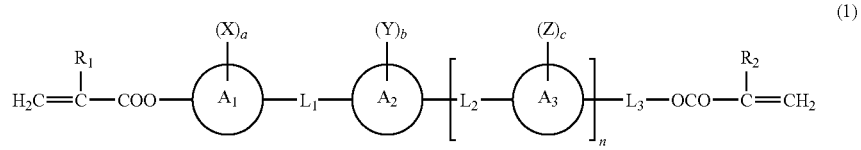

(1)

(In the formula, each of $R_1$ and $R_2$ independently represents a hydrogen atom, methyl group, or halogen atom; each of rings $A_1$, $A_2$, and $A_3$ independently represents a benzene, cyclohexane, cyclohexene, naphthalene, tetrahydronaphthalene, decahydronaphthalene, anthracene, or phenanthrene ring, in which —CH= may be replaced by —N= and —CH$_2$— may be replaced by —S— or —O—;

each of X, Y, and Z independently represents an optionally substituted $C_{1-8}$ alkyl group, optionally substituted $C_{1-8}$ alkoxy group, optionally substituted $C_{2-6}$ alkenyl group, halogen atom, cyano group, or group represented by general formula (2) below;

each of $L_1$, $L_2$, and $L_3$, which are linkages, represents independently a single bond, —COO—, —OCO—, —$(CH_2)_d$—, —CH=CH—, —$(CH_2)_eO$—, —$O(CH_2)_f$—, —$O(CH_2)_gO$—, —$OCOO(CH_2)_h$—, —$(CH_2)_iOCOO$—, —$(CH_2)_jO(CH_2)_k$—, —$O(CH_2)_l$—[$Si(CH_3)_2O]_m$—$Si(CH_3)_2$ $(CH_2)_o$—, —$(OCH_2CH_2)_p$—, —$(CH_2CH_2O)_q$—, —$(OCH_2CH(CH_3))_r$—, —$(CH(CH_3)CH_2)_s$—, —CH=$CHCH_2O$—, —$OCH_2CH$=CH—, —CH=CH—COO—, —OCO—CH=CH—, —C≡C—, —$(CH_2)_2COO$—, —OCO$(CH_2)_2$—, —CF=CF—, —$OCF_2$—, —$CF_2O$—, —C≡C—COO—, —OCO—C≡C—, or —O—, in which some of the carbon atoms may be replaced by silicon atoms;

each of d to m and o independently represents an integer of 1 to 8;

each of p to s independently represents an integer of 1 to 3;

n represents 0 or 1; and a, b, and c are the numbers of substituents on rings $A_1$, $A_2$, and $A_3$, respectively, each of a, b, and c independently represents an integer equal to or less than 2t+2, provided that t is the number of six-membered rings present in the monocyclic or condensed ring to which each substituent bonds, at least either a or b is 1 or larger when n is 0, and at least one of a, b, and c is 1 or larger when n is 1.)

[Formula 2]

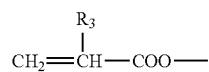

(2)

(In the formula, $R_3$ represents a hydrogen atom, methyl group, or halogen atom.)

The present invention also provides a homopolymer obtained by polymerizing the polymerizable compound.

The present invention also provides a copolymer obtained by copolymerizing the polymerizable compound(s) with (an) other compound(s) with an ethylenic unsaturated bond.

The present invention also provides a copolymer obtained by copolymerizing the polymerizable compound(s) with (a) monomer(s) with an optically active group.

The present invention also provides an optically anisotropic material as a cured product formed from at least one substance selected from the group consisting of the homopolymer, the copolymer, and the composition.

BEST MODE FOR CARRYING OUT THE INVENTION

Hereinafter, the present invention will be detailed based on preferable embodiments thereof.

In general formula (1), the halogen atom represented by $R_1$, $R_2$, X, Y, or Z includes fluorine, chlorine, bromine, and iodine atoms; the optionally substituted $C_{1-8}$ alkyl group represented by X, Y, or Z includes methyl, chloromethyl, trifluoromethyl, cyanomethyl, ethyl, dichloroethyl, propyl, isopropyl, butyl, sec-butyl, tert-butyl, isobutyl, amyl, isoamyl, tert-amyl, hexyl, 2-hexyl, 3-hexyl, cyclohexyl, 1-methylcyclohexyl, heptyl, 2-heptyl, 3-heptyl, isoheptyl, tert-heptyl, n-octyl, isooctyl, tert-octyl, 2-ethylhexyl, and others; the optionally substituted $C_{1-8}$ alkoxy group includes methoxy, chloromethoxy, trifluoromethoxy, cyanomethoxy, ethoxy, dichloroethoxy, propoxy, isopropoxy, butoxy, sec-butoxy, tert-butoxy, isobutoxy, amyloxy, isoamyloxy, tert-amyloxy, hexyloxy, cyclohexyloxy, heptyloxy, isoheptyloxy, tert-heptyloxy, n-octyloxy, isooctyloxy, tert-octyloxy, 2-ethylhexyloxy, and others; and the optionally substituted $C_{2-6}$ alkenyl group includes vinyl, 1-methylethenyl, propenyl, butenyl, isobutenyl, pentenyl, hexenyl, and others.

The halogen atom represented by $R_3$ in general formula (2) includes the ones illustrated above as $R_1$ or others.

When ring $A_1$, $A_2$, or $A_3$ in general formula (1) is a condensed ring, the positions of substituents are as follows: for example, $CH_2$=$CR_1$—COO— and $L_1$ bond to ring $A_1$ so as to keep the linearity in molecular structure of the polymerizable compound. That is, when ring $A_1$ is a naphthalene ring, $CH_2$=$CR_1$—COO— and $L_1$ bond to ring $A_1$ in such a parallel fashion that bonding of $CH_2$=$CR_1$—COO— to the 1-position of the naphthalene ring makes $L_1$ bond to the 5-position whereas bonding of $CH_2$=$CR_1$—COO— to the 2-position makes $L_1$ bond to the 6-position; when ring $A_1$ is a decahydronaphthalene or tetrahydronaphthalene ring, the rule for the case where ring $A_1$ is a naphthalene ring holds true, but in the tetrahydronaphthalene ring, $CH_2$=$CR_1$—COO— may bond to any position of either saturated or unsaturated ring and $L_1$ may bond to any position of the other ring; when ring $A_1$ is an anthracene ring, bonding of $CH_2$=$CR_1$—COO— to the 1-position of the anthracene ring makes $L_1$ bond to the 6-position, bonding of $CH_2$=$CR_1$—COO— to the 2-position makes $L_1$ bond to the 7-position, and bonding of $CH_2$=$CR_1$—COO— to the 3-position makes $L_1$ bond to the 8-position; and when ring $A_1$ is a phenanthrene ring, bonding of $CH_2$=$CR_1$—COO— to the 1-position of the phenanthrene ring makes $L_1$ bond to the 6-position, bonding of $CH_2$=$CR_1$—COO— to the 2-position makes $L_1$ bond to the 7-position, and bonding of $CH_2$=$CR_1$—COO— to the 3-position makes $L_1$ bond to the 8-position.

Linkages $L_1$, $L_2$, and $L_3$ bond to rings $A_2$ and/or $A_3$ so as to keep the linearity in molecular structure of the polymerizable compound, applied the rule for the case of ring $A_1$ correspondingly.

The polymerizable compound of the present invention represented by general formula (1) includes, for example, polymerizable compounds represented by general formula (3) below.

[Formula 3]

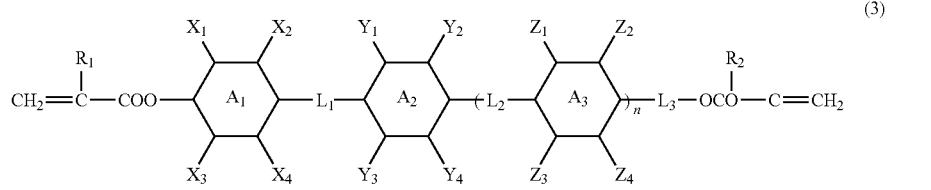

(3)

(In the formula, each of $X_1$ and $X_3$ independently represents a hydrogen atom, optionally substituted $C_{1-8}$ alkyl group, optionally substituted $C_{1-8}$ alkoxy group, optionally substituted $C_{2-6}$ alkenyl group, halogen atom, cyano group, or group represented by general formula (2); each of $X_2$, $X_4$, $Y_1$ to $Y_4$, and $Z_1$ to $Z_4$ independently represents a hydrogen atom, optionally substituted $C_{1-8}$ alkyl group, optionally substituted $C_{1-8}$ alkoxy group, optionally substituted $C_{2-6}$ alkenyl group, halogen atom, or cyano group; at least one of $X_1$ to $X_4$, $Y_1$ to $Y_4$, and $Z_1$ to $Z_4$ represents the substituent other than hydrogen atom; each of rings $A_1$, $A_2$, and $A_3$ independently represents a benzene or cyclohexane ring, in which —CH= may be replaced by —N= and —CH$_2$— may be replaced by —S— or —O—; and $R_1$, $R_2$, $L_1$, $L_2$, $L_3$, and n are identical with those in general formula (1).)

In general formula (3), the halogen atom, $C_{1-8}$ alkyl group, $C_{1-8}$ alkoxy group, and optionally substituted $C_{2-6}$ alkenyl group represented by $X_1$ to $X_4$, $Y_1$ to $Y_4$, or $Z_1$ to $Z_4$ are identical with those represented by X, Y, or Z in general formula (1).

The polymerizable compound of the present invention represented by general formula (1) also includes, for example, polymerizable compounds represented by general formula (4) below.

[Formula 4-1]

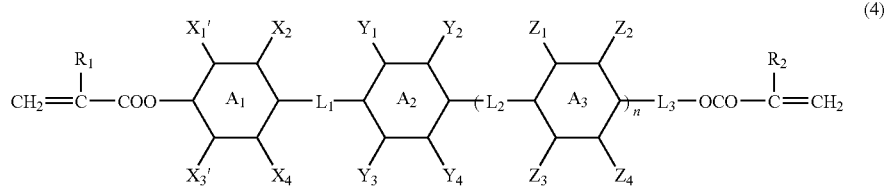

(4)

(In the formula, each of $X_1'$ and $X_3'$ independently represents a hydrogen atom, $C_{1-8}$ alkyl group, $C_{1-8}$ alkoxy group, optionally substituted $C_{2-6}$ alkenyl group, halogen atom, or cyano group; $R_1$, $R_2$, $X_2$, $X_4$, $Y_1$ to $Y_4$, $Z_1$ to $Z_4$, $L_1$, $L_2$, $L_3$, $A_1$, $A_2$, $A_3$, and n are identical with those in general formula (3); and at least one of $X_1'$, $X_3'$, $X_2$, $X_4$, $Y_1$ to $Y_4$, and $Z_1$ to $Z_4$ represents the substituent other than hydrogen atom.)

In general formula (4), the halogen atom, $C_{1-8}$ alkyl group, $C_{1-8}$ alkoxy group, and optionally substituted $C_{2-6}$ alkenyl group represented by $X_1'$ or $X_3'$ are identical with those represented by $X_1$ or $X_3$ in general formula (3).

The polymerizable compound of the present invention represented by general formula (1) also includes polymerizable compounds represented by general formula (5) below.

[Formula 4-2]

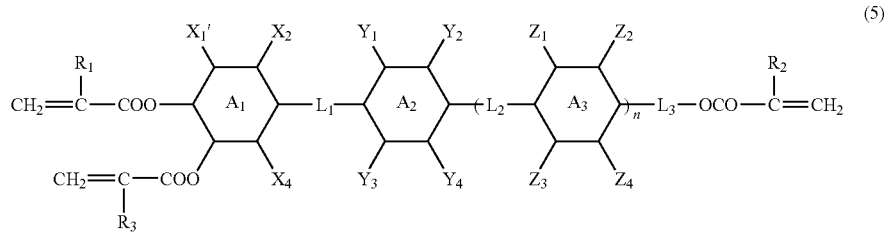

(5)

(In the formula, $X_1'$ represents a hydrogen atom, $C_{1-8}$ alkyl group, $C_{1-8}$ alkoxy group, halogen atom, or cyano group; $R_1$, $R_2$, $X_2$, $X_4$, $Y_1$ to $Y_4$, $Z_1$ to $Z_4$, $L_1$, $L_2$, $L_3$, $A_1$, $A_2$, $A_3$, and n are identical with those in general formula (3); and $R_3$ is identical with that in general formula (2).)

In general formula (5), the halogen atom, $C_{1-8}$ alkyl group, $C_{1-8}$ alkoxy group, and optionally substituted $C_{2-6}$ alkenyl group represented by $X_1'$ are identical with those represented by $X_1$ in general formula (3).

The polymerizable compound of the present invention represented by general formula (1) also includes polymerizable compounds represented by general formula (6) below.

[Formula 5]

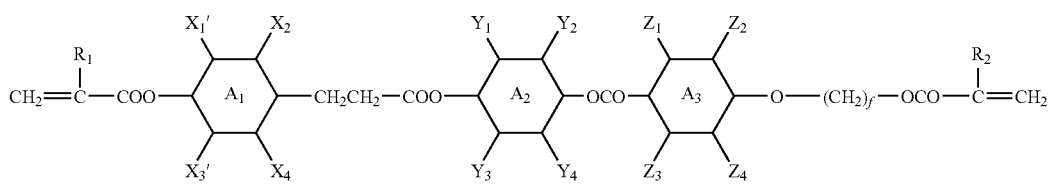

(6)

(In the formula, $R_1$, $R_2$, $X_1'$, $X_3'$, $X_2$, $X_4$, $Y_1$ to $Y_4$, $Z_1$ to $Z_4$, $A_1$, $A_2$, and $A_3$ are identical with those in general formula (4); and f is identical with that in general formula (1).)

The polymerizable compound of the present invention represented by general formula (1) also includes polymerizable compounds represented by general formula (7) below.

[Formula 6]

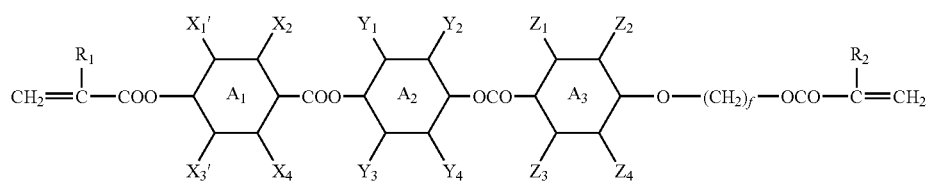

(7)

(In the formula, $R_1$, $R_2$, $X_1'$, $X_3'$, $X_2$, $X_4$, $Y_1$ to $Y_4$, $Z_1$ to $Z_4$, $A_1$, $A_2$, and $A_3$ are identical with those in general formula (4); and f is identical with that in general formula (1).)

The polymerizable compound of the present invention represented by general formula (1) also includes polymerizable compounds represented by general formula (8) or (9) below.

[Formula 7-1]

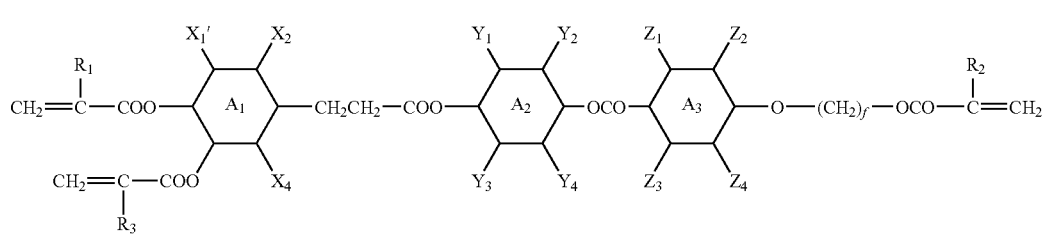

(8)

(In the formula, $R_1$ to $R_3$, $X_1'$, $X_2$, $X_4$, $Y_1$ to $Y_4$, $Z_1$ to $Z_4$, $A_1$, $A_2$, and $A_3$ are identical with those in general formula (5); and f is identical with that in general formula (1).)

[Formula 7-2]

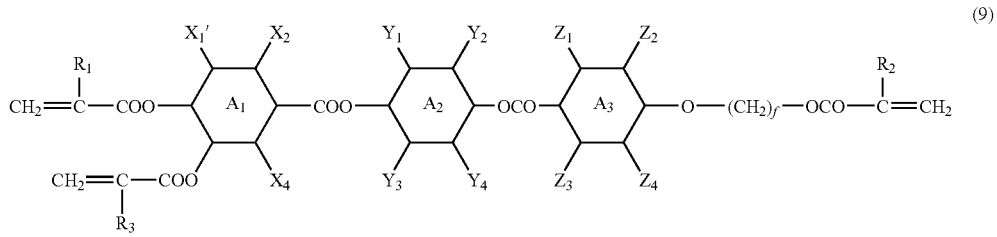

(9)

(In the formula, $R_1$ to $R_3$, $X_1'$, $X_2$, $X_4$, $Y_1$ to $Y_4$, $Z_1$ to $Z_4$, $A_1$, $A_2$, and $A_3$ are identical with those in general formula (5); and f is identical with that in general formula (1).)

The polymerizable compound of the present invention represented by general formula (1) also includes polymerizable compounds represented by general formula (10) below.

[Formula 8]

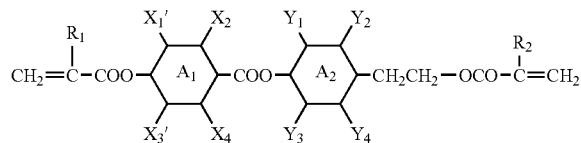

(10)

(In the formula, $R_1$, $R_2$, $X_1'$, $X_3'$, $X_2$, $X_4$, $Y_1$ to $Y_4$, $A_1$, and $A_2$ are identical with those in general formula (4)).

Specific examples of the polymerizable compound of the present invention represented by general formula (1) include Compounds No. 1 to 29 below. The present invention is, however, not limited by the following compounds.

[Formula 9]

Compound No. 1

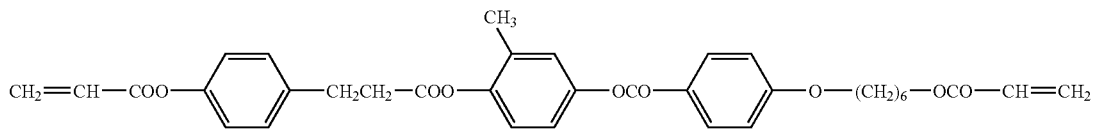

[Formula 10]

Compound No. 2

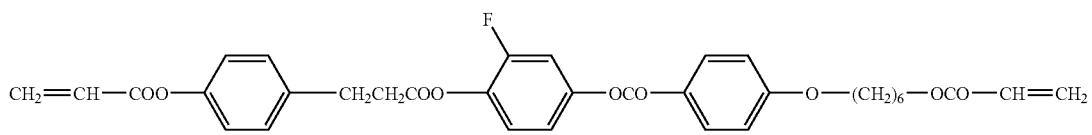

[Formula 11]

Compound No. 3

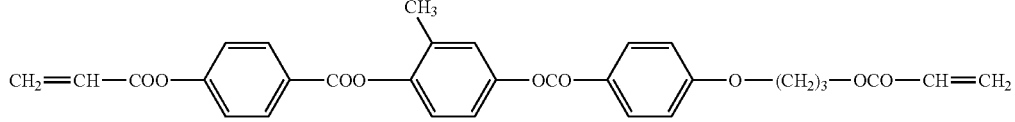

-continued
[Formula 12]
Compound No. 4
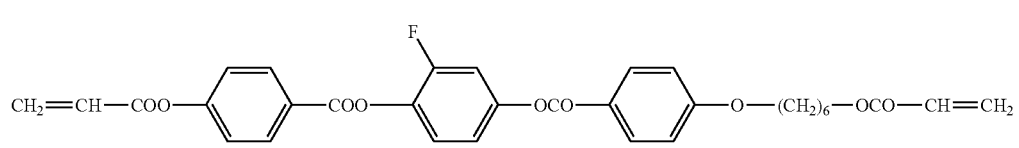
[Formula 13]
Compound No. 5
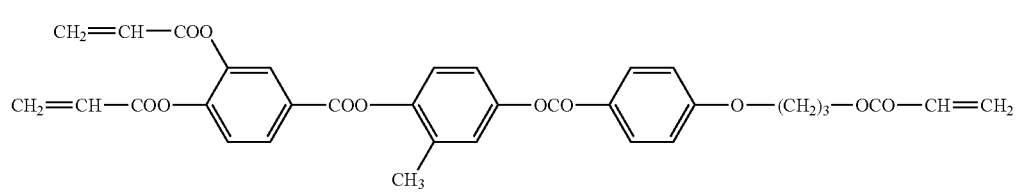
[Formula 14]
Compound No. 6
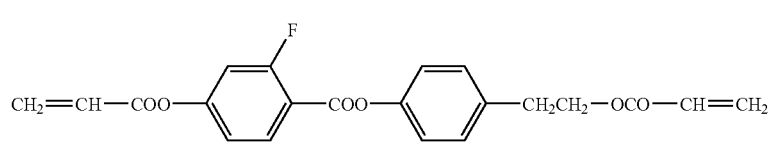
[Formula 15]
Compound No. 7
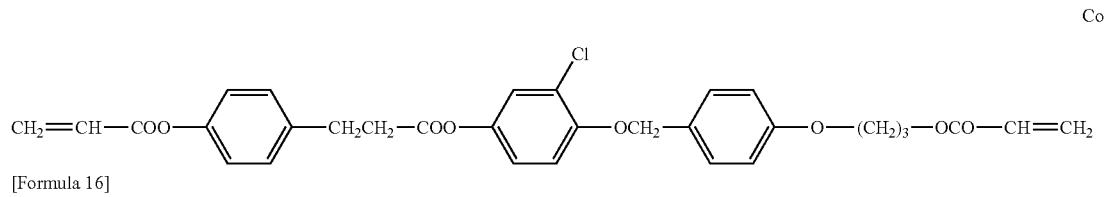
[Formula 16]
Compound No. 8
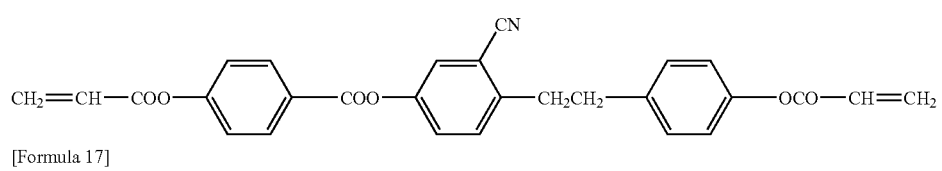
[Formula 17]
Compound No. 9
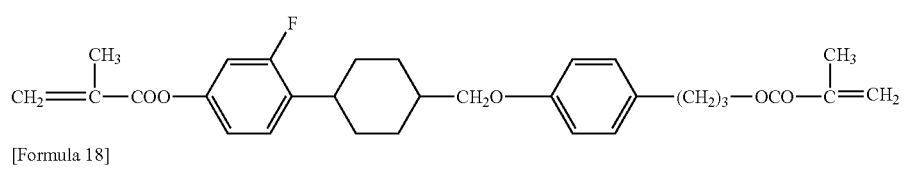
[Formula 18]
Compound No. 10
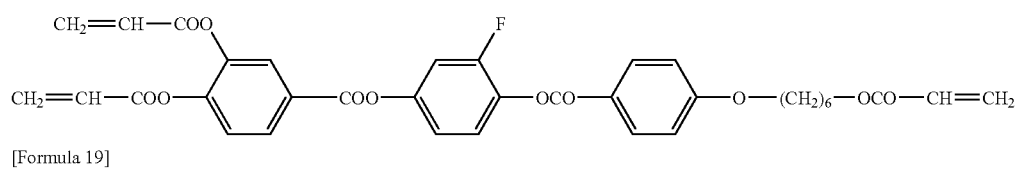
[Formula 19]
Compound No. 11
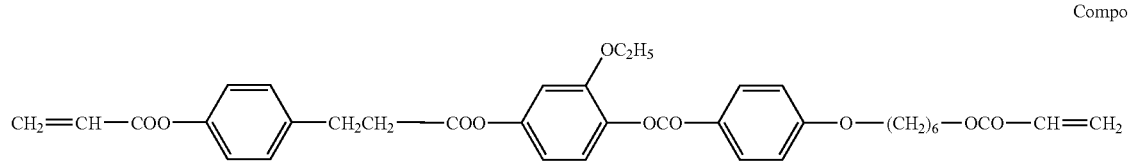

-continued
[Formula 20]
Compound No. 12
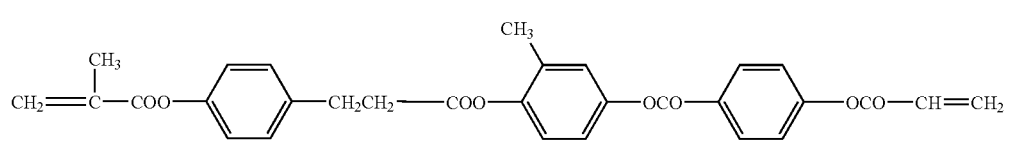
[Formula 21]
Compound No. 13
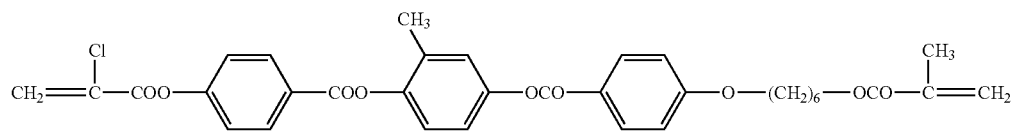
[Formula 22]
Compound No. 14
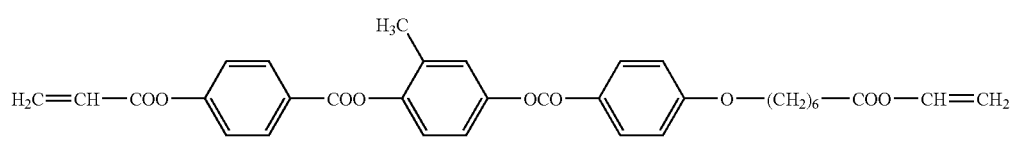
[Formula 23]
Compound No. 15
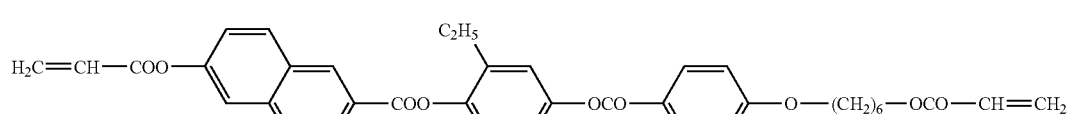
[Formula 24]
Compound No. 16
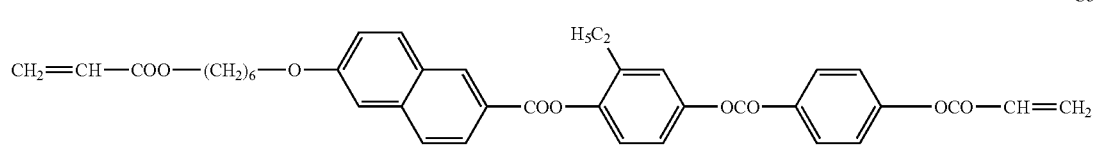
[Formula 25]
Compound No. 17
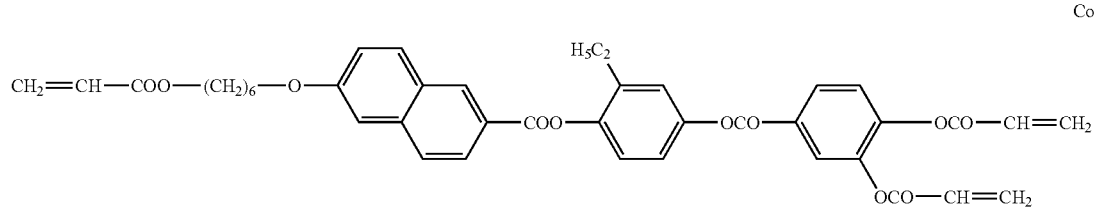
[Formula 26]
Compound No. 18
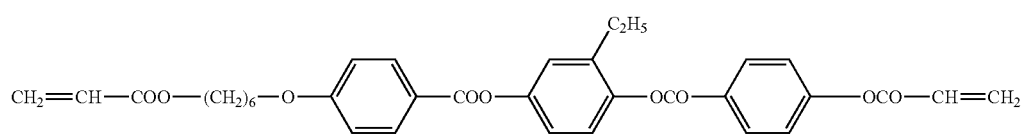
[Formula 27]
Compound No. 19
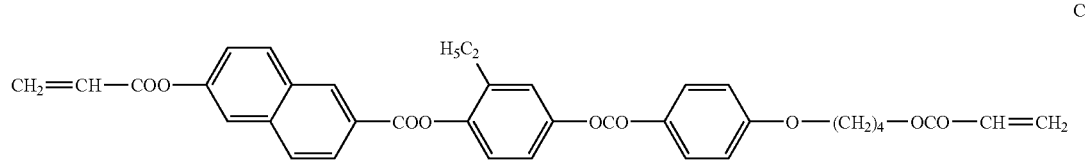

-continued
[Formula 28]
Compound No. 20
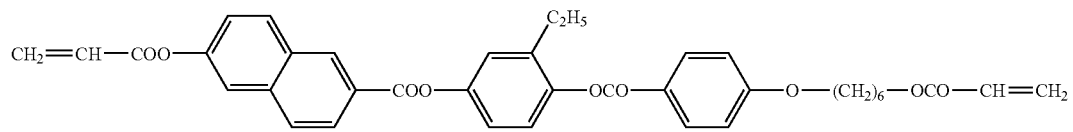
[Formula 29]
Compound No. 21
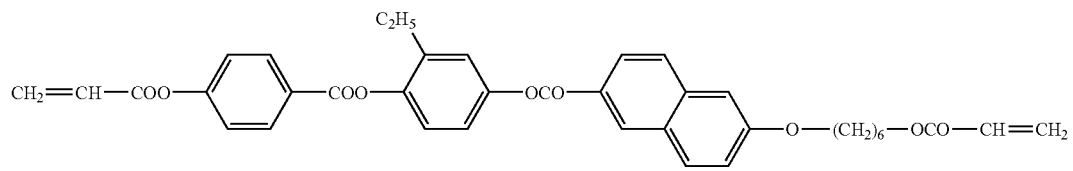
[Formula 30]
Compound No. 22
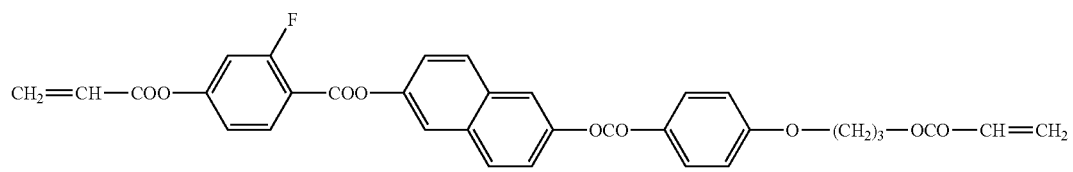
[Formula 31]
Compound No. 23
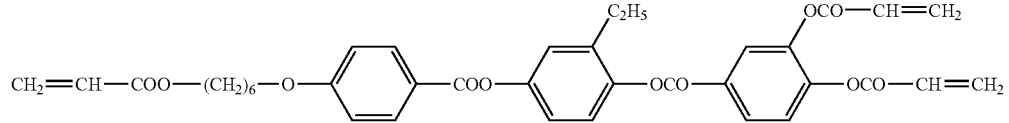
[Formula 32]
Compound No. 24
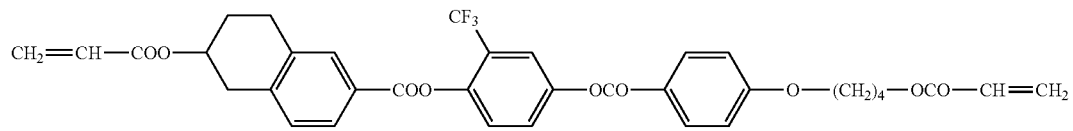
[Formula 33]
Compound No. 25
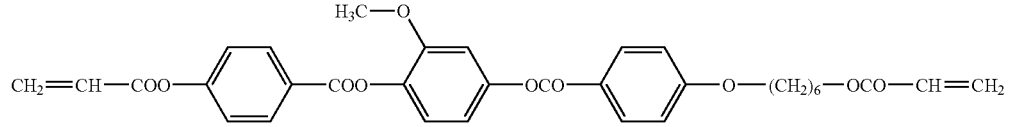
[Formula 34]
Compound No. 26
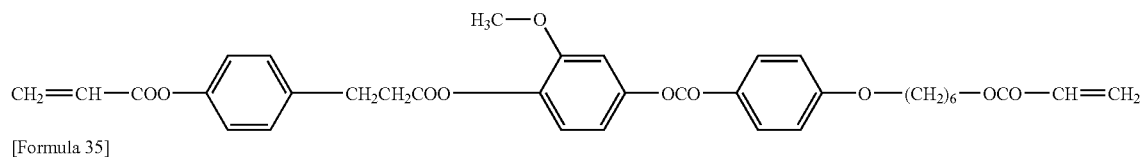
[Formula 35]
Compound No. 27
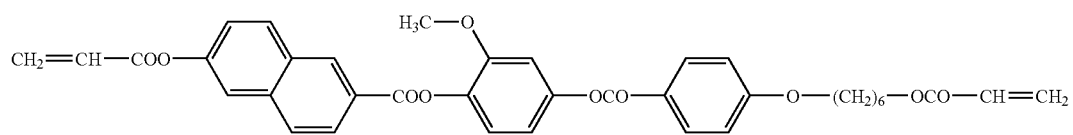

[Formula 36-1]
Compound No. 28
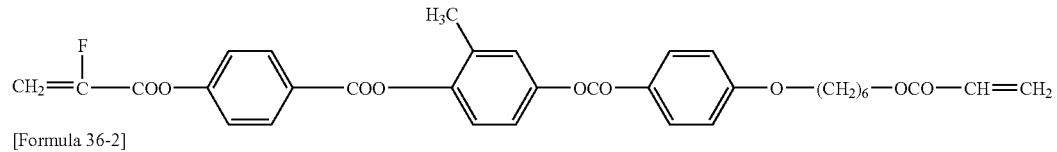
[Formula 36-2]
Compound No. 29
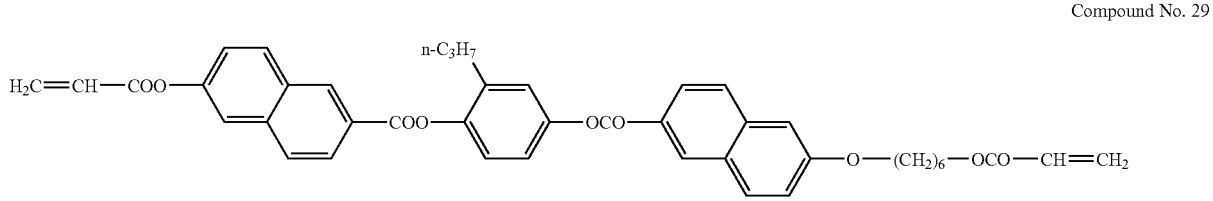
The polymerizable compound of the present invention represented by general formula (1) can be manufactured, for example, according to the reaction scheme given in [Formula 37] below.
[Formula 37]
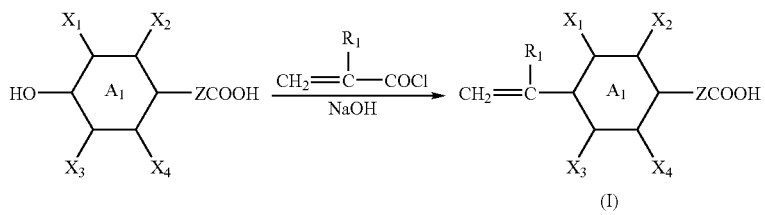
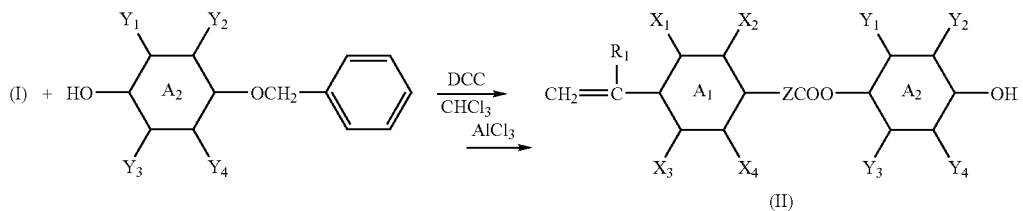
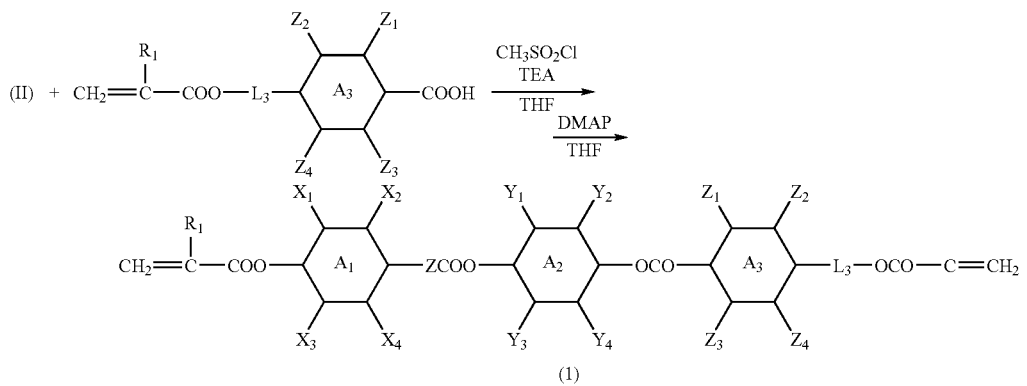

The polymerizable compound of the present invention may be polymerized singly or in combination of two or more as (a) polymerizable liquid crystalline monomer(s). The polymerizable compound of the present invention may be also copolymerized with (a) compound(s) with an ethylenic unsaturated bond. The compound with an ethylenic unsaturated bond includes, for example, liquid crystalline monomers with an ethylenic unsaturated bond other than the polymerizable compound of the present invention (referred to as "other liquid crystalline monomer" hereinafter), monomers with an optically active group, and compounds such as (meth)acrylic esters. Such compounds with an ethylenic unsaturated bond are used in an amount properly chosen according to their structures, but a preferred range is such that the polymerizable compound of the present invention is 1 wt % or higher, particularly 3 wt % or higher in all the monomers.

Specific examples of other liquid crystalline monomers described above include Compounds H-1 to H-24 below.

[Formula 38]

Compound H-1

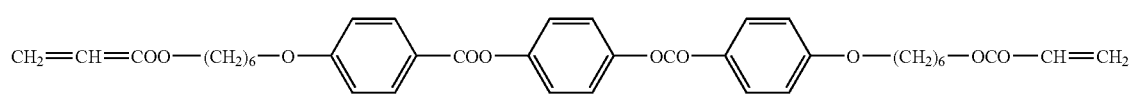

[Formula 39]

Compound H-2

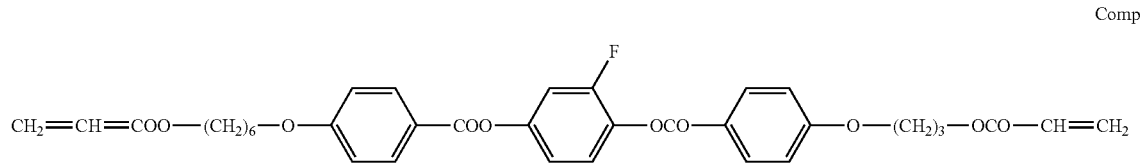

[Formula 40]

Compound H-3

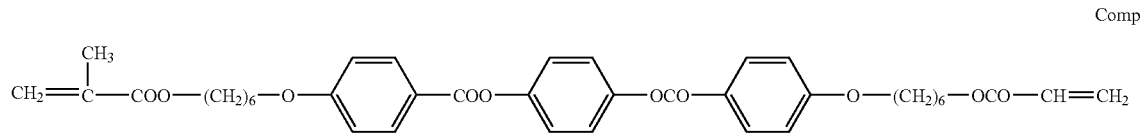

[Formula 41]

Compound H-4

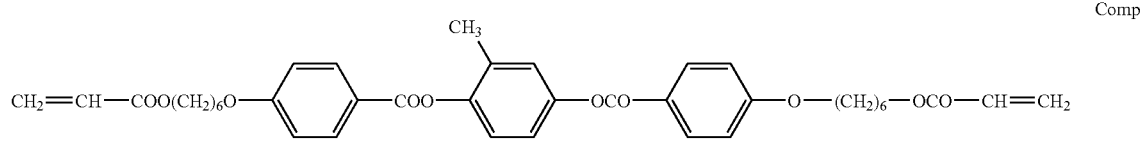

[Formula 42]

Compound H-5

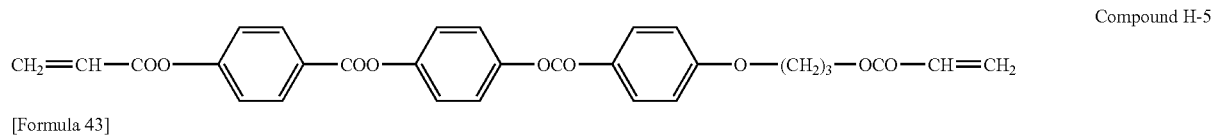

[Formula 43]

Compound H-6

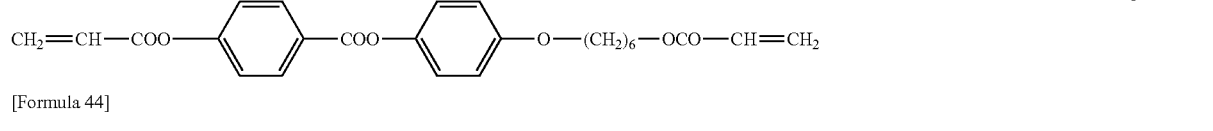

[Formula 44]

Compound H-7

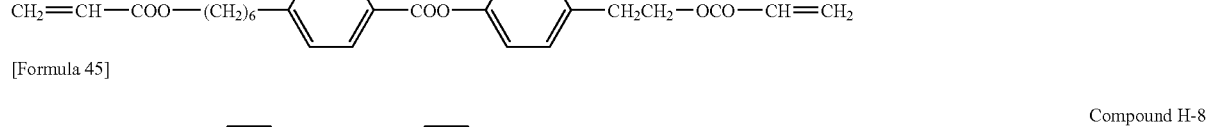

[Formula 45]

Compound H-8

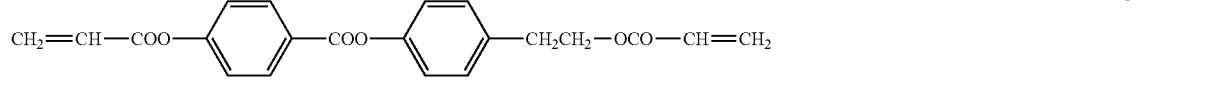

-continued
[Formula 46]
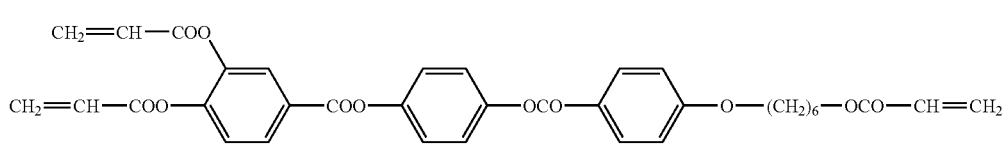
Compound H-9
[Formula 47]
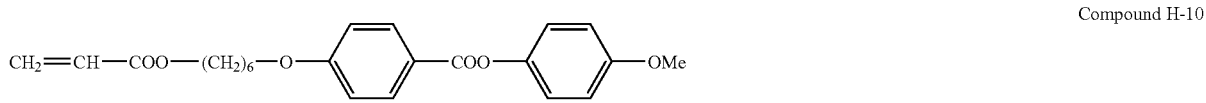
Compound H-10
[Formula 48]
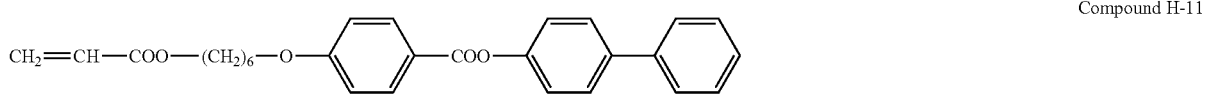
Compound H-11
[Formula 49]
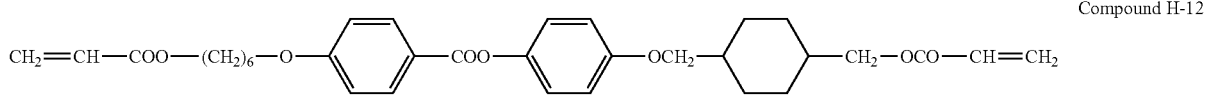
Compound H-12
[Formula 50]
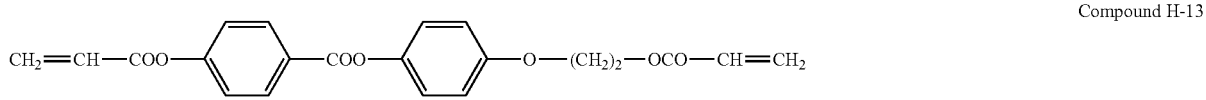
Compound H-13
[Formula 51]
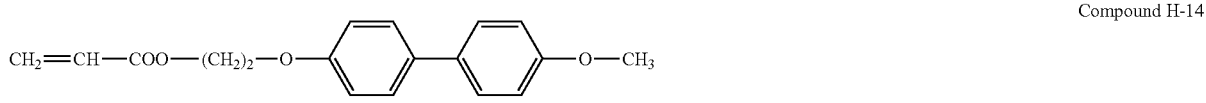
Compound H-14
[Formula 52]
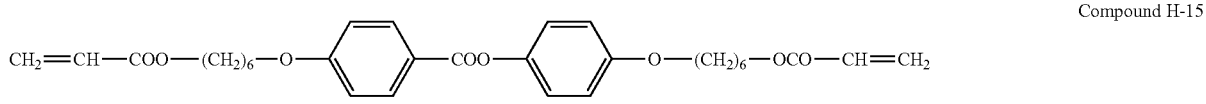
Compound H-15
[Formula 53]
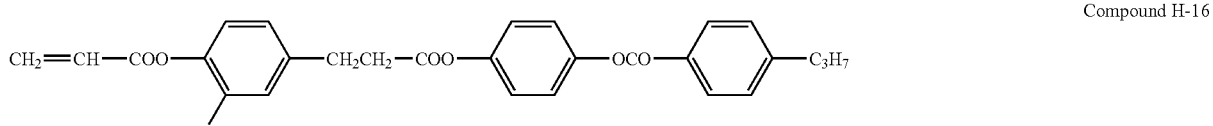
Compound H-16
[Formula 54]
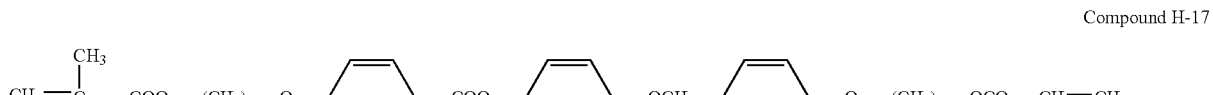
Compound H-17
[Formula 55]
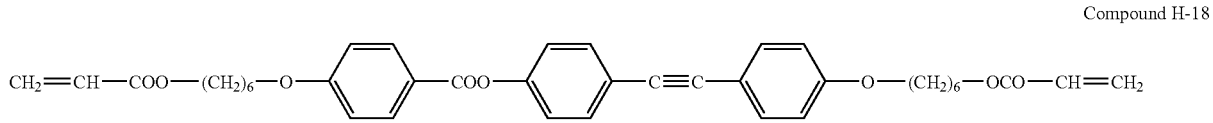
Compound H-18

[Formula 56]

Compound H-19

[Formula 57]

Compound H-20

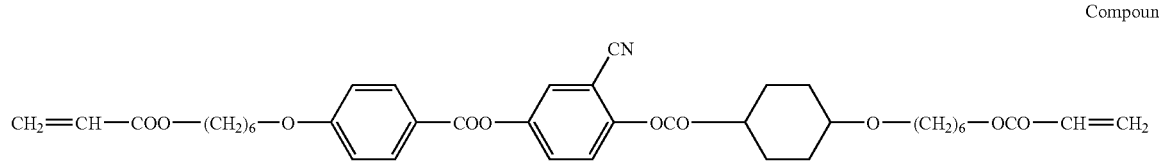

[Formula 58]

Compound H-21

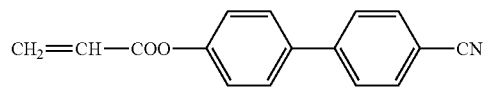

[Formula 59]

Compound H-22

[Formula 60]

Compound H-23

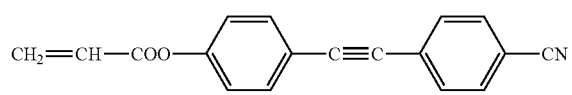

[Formula 61]

Compound H-24

The monomers with an optically active group include, for example, compounds with an ethylenic unsaturated bond among the compounds illustrated hereinafter as the optically active compounds, compounds having both one or more groups selected from maleimide, epoxy, and oxetane groups and an optically active group, and others.

The compounds with an ethylenic unsaturated bond such as (meth)acrylates include (meth)acrylates such as methyl (meth)acrylate, ethyl(meth)acrylate, propyl(meth)acrylate, butyl(meth)acrylate, sec-butyl(meth)acrylate, tert-butyl (meth)acrylate, hexyl(meth)acrylate, 2-ethylhexyl(meth) acrylate, tetrahydrofurfuryl(meth)acrylate, glycidyl(meth) acrylate, allyl(meth)acrylate, allyloxy(meth)acrylates, cyclohexyl(meth)acrylate, benzyl(meth)acrylate, 1-phenylethyl(meth)acrylate, 2-phenylethyl(meth)acrylate, furfuryl (meth)acrylate, diphenylmethyl(meth)acrylate, naphthyl (meth)acrylate, pentachlorophenyl(meth)acrylate, 2-chloroethyl(meth)acrylate, methyl α-chloro(meth)acrylate, phenyl α-bromo(meth)acrylate, trifluoroethyl(meth) acrylate, tetrafluoropropyl(meth)acrylate, polyethylene glycol di(meth)acrylate, 1,4-butanediol di(meth)acrylate, 1,6-hexanediol di(meth)acrylate, trimethylolpropane tri(meth) acrylate, pentaerythritol tri(meth)acrylate, pentaerythritol tetra(meth)acrylate, dipentaerythritol penta(meth)acrylate, and dipentaerythritol hexa(meth)acrylate, diacetoneacrylamide, styrene, vinyltoluene, divinylbenzene, and others.

As described above, the polymerizable compound of the present invention can be converted to a liquid crystalline polymer or liquid crystalline copolymer by polymerization or copolymerization.

The composition of the present invention contains the polymerizable compound of the present invention, the content of which is preferably 10 to 80 mass %. When an optical element is formed from the composition of the present invention, it is preferred that the composition exists in a liquid crystal phase at least around ambient temperature, desirably at 15° C. or below.

The composition of the present invention may contain a liquid crystalline is compound other than the polymerizable compound of the present invention, for example, the aforementioned other liquid crystalline monomer. The content of the liquid crystalline compound is, however, preferably 50 mass % or less, particularly 30 mass % or less in the composition of the present invention in order to keep heat resistance of polymers prepared using the composition of the present invention.

Polymerization initiators such as thermal polymerization initiators and photo-polymerization initiators may be added to the composition of the present invention in order to accelerate the polymerization reaction. The thermal polymerization initiators include, for example, benzoyl peroxide, 2,2'-azobisisobutyronitrile, and others. The photo-polymerization initiators include, for example, benzoin ethers, benzophenones, acetophenones, benzil ketals, and others. When added, the amount of such initiator is preferably 10 mass % or less, further preferably 5 mass % or less, most preferably in a range of 0.5 mass % to 3 mass % relative to the composition of the present invention.

Stabilizers may be added to the composition of the present invention to improve the storage stability. The usable stabilizers include, for example, hydroquinone, hydroquinone monoalkyl ethers, tert-butylcatechols, pyrogallols, thiophenols, nitro compounds, 2-naphthylamines, 2-hydroxynaphthalenes, and others. When added, the amount of such compounds is preferably 1 mass % or less, especially preferably 0.5 mass % or less, relative to the composition of the present invention.

Optically active compounds may be added to the composition of the present invention in order to obtain a polymer having a helical structure as the liquid crystal backbone. The optically active compounds include, for example, the following compounds.

[Formula 62]

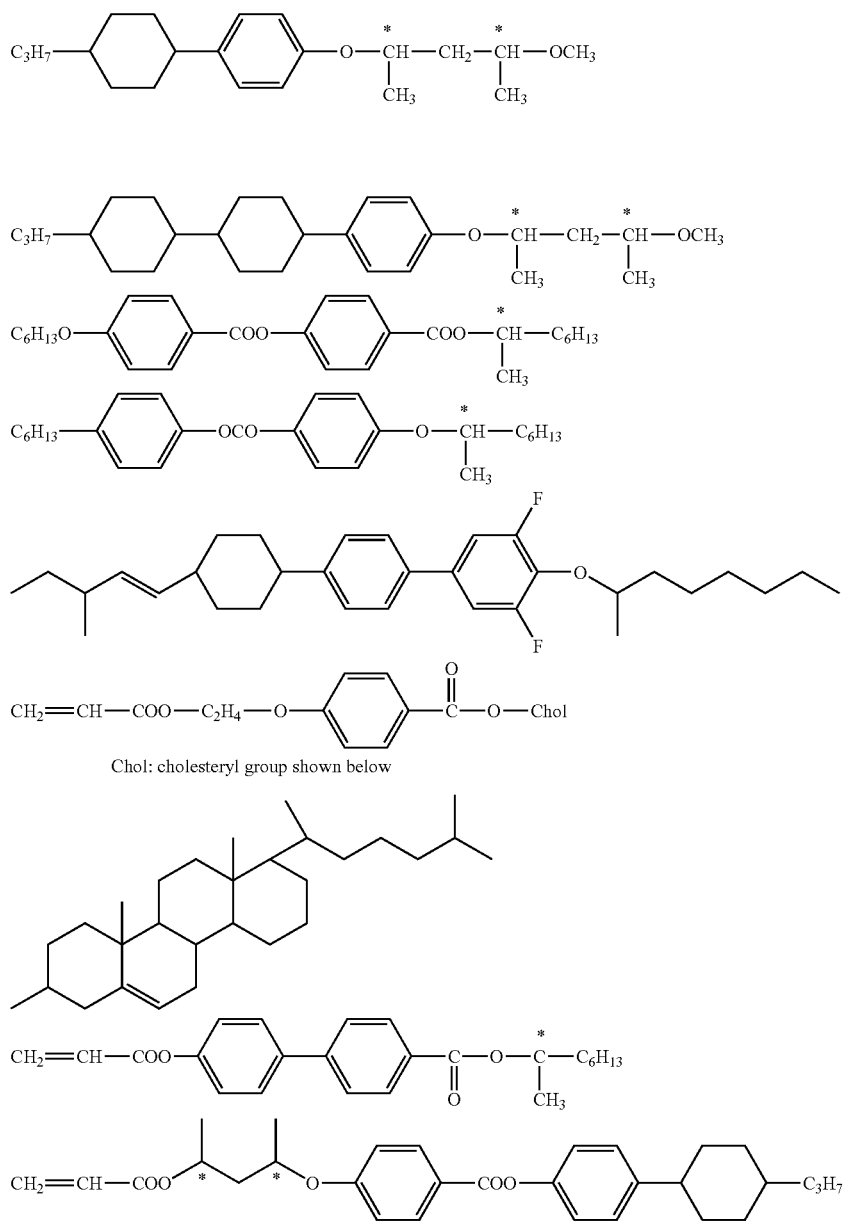

-continued

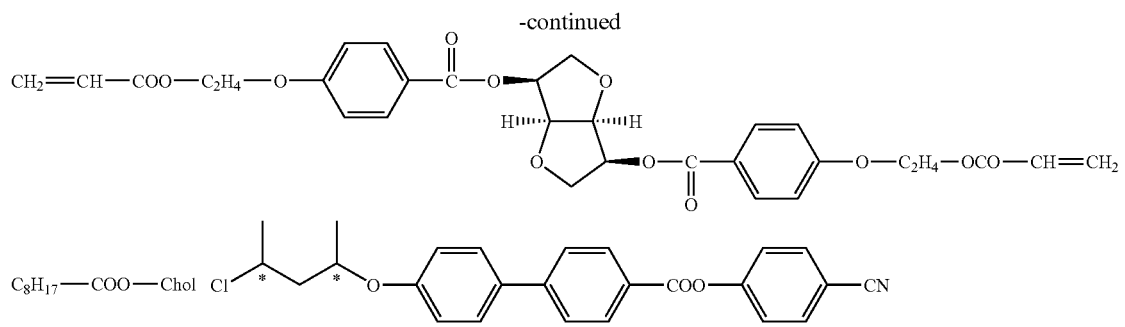

When the composition of the present invention is used for polarizing films or oriented films as a raw material, printing inks and paints, protective films, and others, there may be added, according to purposes thereof, metals, metal complexes, dyes, pigments, colorants, fluorescers, phosphorescers, surfactants, leveling agents, thixotropic agents, gelators, polysaccharides, ultraviolet absorbers, infrared absorbers, antioxidants, ion exchange resins, metal oxides such as titanium oxide, polymerization inhibitors, photosensitizers, crosslinkers, auxiliaries for orienting liquid crystals, and others.

The composition of the present invention can be cured by polymerization or copolymerization. For example, a cured film formed from the (co)polymer made of the composition of the present invention can be manufactured by applying the composition of the present invention, which is dissolved in a solvent if needed, to a support, followed by drying and polymerization by irradiation with ultraviolet or another beam. Preferred examples of the support include, although not limited to, plates made of glass, polyethylene terephthalate, polycarbonate, polyimide, polyamide, polymethyl methacrylate, polystryene, polyvinyl chloride, polytetrafluoroethylene, cellulose, or silicon, reflective plates, calcite plates, and others. As a method for applying the composition of the present invention to the support, there may be employed a known method including, for example, curtain coating, extrusion coating, roll coating, spin coating, dip coating, bar coating, spray coating, slide coating, print coating, and others.

In manufacturing the (co)polymer from the composition of the present invention, solvents to be used include, for example, tetrahydrofuran, cyclohexanone, methyl ethyl ketone, and others.

In preparing the cured film formed from the (co)polymer made of the composition of the present invention, a method to orient the polymerizable compound of the present invention includes, for example, a preceding orientation treatment of the support. A preferred method for the orientation treatment of the support includes a method of providing a layer for orienting liquid crystal made of oriented polyimide films, oriented polyvinyl alcohol films, or others on the support, followed by performing rubbing or other treatment. The method to orient the polymerizable liquid crystalline compound in the composition of the present invention also includes, for example, application of magnetic field, electric field, or others to the liquid crystal composition on the support. The film thickness of the cured film is properly chosen according to application or others of the cured film, but preferably chosen from a range of 0.1 to 10 μm.

The composition of the present invention can be polymerized by a known method using heat or electromagnetic wave. A preferred polymerization reaction induced by electromagnetic wave is radical polymerization with ultraviolet irradiation using the above-mentioned photo-polymerization initiators. Forming crosslink by applying a magnetic field or electric field is also preferred. The liquid crystal (co)polymer formed on the support may be used as it is or may be used after separated from the support or transferred to another support as needed.

The cured products of the composition of the present invention can be used as optically anisotropic materials including retardation films for liquid crystal displays, optical compensation plates (retardation plates) for liquid crystal displays, orientation films for liquid crystal displays, optical elements such as polarization plates, wide view films, reflective films, color filters, holographic elements, polarizing prisms, and optical heads, low-pass filters, polarizing beam splitters, and others. The above-described polymer and copolymer of the polymerizable compound of the present invention can be also used as such optically anisotropic materials.

EXAMPLES

Hereinafter, the present invention will be further detailed with Synthesis Examples, Examples, and others. The present invention is, however, not limited by the Synthesis Examples, Examples, and others below.

In Synthesis Examples and others below, the structures of the compounds were confirmed by nuclear magnetic resonance ($^1$H-NMR) spectra, infrared absorption (IR) spectra and others. Thermal phase transition behavior of the compounds was also observed with a DSC and a polarization microscope. In schemata illustrating the thermal phase transition behavior below, C, N, and I denote crystal, nematic, and isotropic liquid phases, respectively.

Synthesis Example 1

Synthesis of Compound No. 1

Compound No. 1 was synthesized according to the procedures of Steps 1 to 4 below.

<Step 1> Synthesis of Acrylic Ester

The following acrylic ester was synthesized according to the reaction formula given by [Formula 63] in the following manner.

[Formula 63]

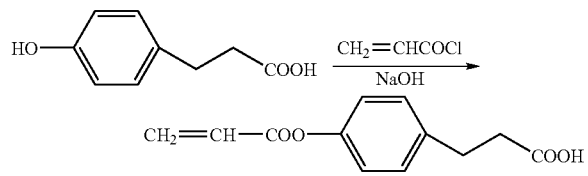

To a stirred mixture of 18.36 g (110 mmol) of 3-(4-hydroxyphenyl)propionic acid, 11.05 g (280 mmol) of sodium hydroxide, and 100 g of water, was added 10 g (110 mmol) of acryloyl chloride dropwise at 20° C., and the reaction was conducted for 2 hours. After the reaction, the mixture was acidified by adding 4-mol/l hydrochloric acid dropwise, and the precipitate was collected by filtration and air-dried. This precipitate was recrystallized from methanol-water (3:4) mixed solvent to give white solid (11.68 g; Yield 48%).

The results of infrared (IR) spectrometry for the white solid obtained are as follows, confirming that the white solid is the desired acrylic ester.

[IR] (cm$^{-1}$) 2920, 1740, 1697, 1508, 1447, 1408, 1366, 1296, 1254, 1200, 1173, 1150, 1018

<Step 2> Synthesis of Benzyl Ether Derivative

The following benzyl ether derivative was synthesized according to the reaction formula given by [Formula 64] in the following manner.

[Formula 64]

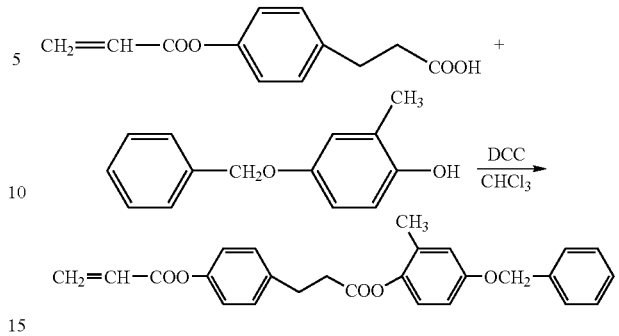

To a stirred mixture of 1.20 g (5.6 mmol) of the acrylic ester obtained in Step 1, 1.00 g (4.7 mmol) of 4-benzyloxy-2-methylphenol, 0.171 g (1.4 mmol) of N,N-dimethylaminopyridine (DMAP), and 12 g of chloroform, was added 1.16 g (5.6 mmol) of dicyclohexylcarbodiimide dissolved in 12 g of chloroform dropwise at 20° C., and the mixture was stirred for 3 hours. Precipitate was removed by filtration, the solvent was evaporated from the filtrate, and the residue was purified by column chromatography (ethyl acetate:n-hexane=1:3, SiO$_2$) to give the desired benzyl ether derivative as white crystals (1.83 g, Yield: 94%).

<Step 3> Synthesis of Phenol Derivative

The following phenol derivative was synthesized according to the reaction formula given by [Formula 65] in the following manner.

[Formula 65]

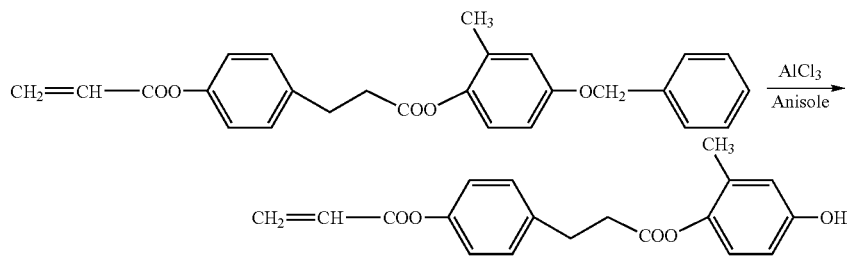

In 9 g of anisole was dissolved 1.76 g (13 mmol) of anhydrous aluminum chloride and the solution was chilled with ice-water. Here was added 1.83 g (4.4 mmol) of the benzyl ether derivative obtained in Step 2 dissolved in 9 g of anisole dropwise. After stirring for 30 minutes, hydrochloric acid was added dropwise to the reaction mixture to dissolve the precipitate. The organic layer was washed with water, the solvent was evaporated, and the residue was purified by column chromatography (ethyl acetate:n-hexane=1:5, SiO$_2$) to give the desired phenol derivative as white crystals (1.00 g, Yield: 70%).

<Step 4> Synthesis of Compound No. 1

Compound No. 1 was synthesized according to the reaction formula given by [Formula 66] in the following manner.

[Formula 66]

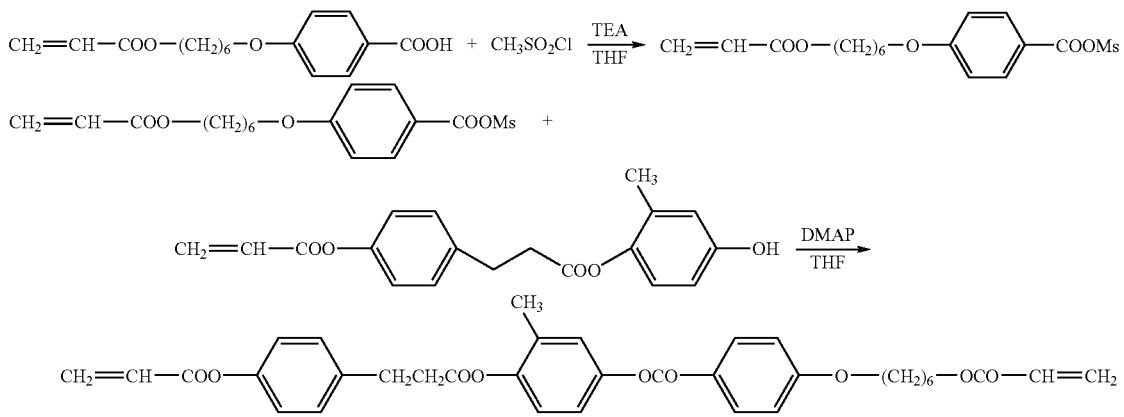

To an ice-cooled solution containing 0.90 g (3.1 mmol) of 4-(6-acryloyloxy-hexa-1-yloxy)benzoic acid in 10 g of tetrahydrofuran (THF), 0.42 g (3.7 mmol) of methanesulfonyl chloride was added, and 0.74 g (7.4 mmol) of triethylamine was added dropwise at 10° C. or below. After stirring for 30 minutes, 38 mg (0.31 mmol) of DMAP was added to the reaction mixture, here was added dropwise 1.00 g (3.1 mmol) of the phenol derivative obtained in Step 3 dissolved in 10 g of THF, and the mixture was stirred for 30 minutes. The precipitate was removed by filtration, the solvent was evaporated from the filtrate, and the residue was purified by column chromatography (ethyl acetate:n-hexane=1:3, $SiO_2$). The resultant solid was dissolved in chloroform and this solution was poured into chilled methanol to yield white crystals (0.18 g, Yield: 10%). Analysis of the white crystals obtained confirmed that this white crystalline substance was the desired product, Compound No. 1. The analytical results are shown below.

When a homopolymer of Compound No. 1 obtained was prepared, the polymer showed different refractive indices depending on the direction, confirming that this polymer functions as an optically anisotropic material.

(Analytical Results)

(1) IR ($cm^{-1}$) 2939, 2866, 1728, 1605, 1508, 1408, 1300, 1246, 1165, 1080, 1007.

(2) NMR (ppm) 8.2 (d; 2H), 7.3-6.9 (m; 9H), 6.6-5.7 (m; 6H), 4.3-3.9 (m; 4H), 3.2-2.8 (m; 4H), 2.1 (s, 3H), 1.7-1.4 (m; 8H).

(3) Thermal phase transition behavior

Thermal phase transition behavior is shown in [Formula 67] below.

[Formula 67]

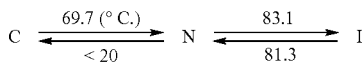

Synthesis Example 2

Synthesis of Compound No. 2

Compound No. 2 was synthesized according to the following procedure of Steps 1 to 3.

<Step 1> Synthesis of Benzyl Ether Derivative

The following benzyl ether derivative was synthesized according to the reaction formula given by [Formula 68] in the following manner.

[Formula 68]

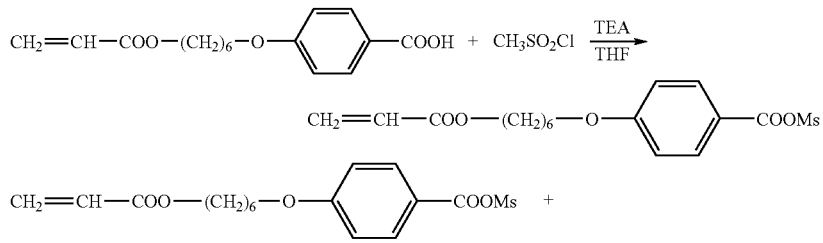

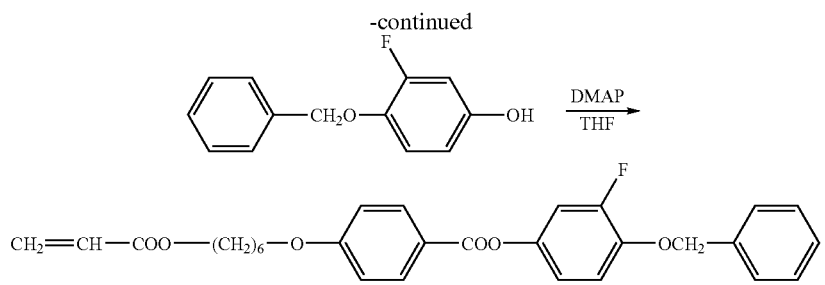

To an ice-cooled solution containing 6.29 g (21 mmol) of 4-(6-acryloyloxy-hexa-1-yloxy)benzoic acid in 30 g of THF, 2.86 g (25 mmol) of methanesulfonyl chloride was added, and 5.06 g (50 mmol) of triethylamine was added dropwise at 10° C. or below. After stirring for 30 minutes, 254 mg (2.1 mmol) of DMAP was added to the reaction mixture, 5.00 g (23 mmol) of 4-benzyloxy-3-fluorophenol dissolved in 10 g of THF was added dropwise, and the mixture was stirred for 30 minutes. The precipitate was removed by filtration, the solvent was evaporated from the filtrate, and the residue was recrystallized from THF-methanol (1:2) mixed solvent to yield the desired benzyl ether derivative as white crystals (9.39 g, Yield: 92%).

<Step 2> Synthesis of Phenol Derivative

The following phenol derivative was synthesized according to the reaction formula given by [Formula 69] in the following manner.

[Formula 69]

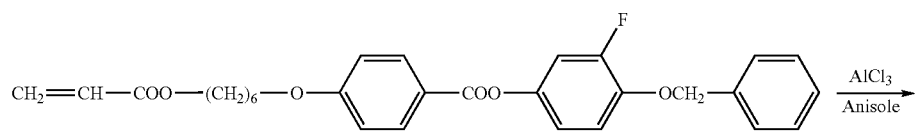

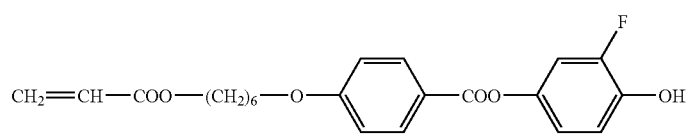

To an ice-cooled solution containing 7.63 g (57 mmol) of anhydrous aluminum chloride in 50 g of anisole, was added dropwise 9.39 g (19 mmol) of the benzyl ether derivative obtained in Step 1 dissolved in 50 g of anisole. After stirring for 30 minutes, hydrochloric acid was added dropwise to the reaction mixture to dissolve the precipitate, and the organic layer was washed with water. The solvent was evaporated, and the residue was added to n-hexane. The precipitate was collected by filtration, purified by column chromatography (ethyl acetate:n-hexane=1:5, $SiO_2$), and recrystallized from methanol to yield the desired phenol derivative as white crystals (6.57 g, Yield: 86%).

<Step 3> Synthesis of Compound No. 2

Compound No. 2 was synthesized according to the reaction formula given by [Formula 70] in the following manner.

[Formula 70]

$$CH_2{=}CH{-}COO{-}\underset{}{\bigcirc}{-}CH_2CH_2COOH + CH_3SO_2Cl \xrightarrow[THF]{TEA} CH_2{=}CH{-}COO{-}\underset{}{\bigcirc}{-}CH_2CH_2COOMs +$$

$$CH_2{=}CH{-}COO{-}(CH_2)_6{-}O{-}\underset{}{\bigcirc}{-}COOMs +$$

$$CH_2{=}CH{-}COO{-}(CH_2)_6{-}O{-}\underset{}{\bigcirc}{-}COO{-}\underset{F}{\bigcirc}{-}OH \xrightarrow[THF]{DMAP}$$

$$CH_2{=}CH{-}COO{-}\underset{}{\bigcirc}{-}CH_2CH_2COO{-}\underset{F}{\bigcirc}{-}OCO{-}\underset{}{\bigcirc}{-}O{-}(CH_2)_6{-}OCO{-}CH{=}CH_2$$

To an ice-cooled solution containing 3.26 g (15 mmol) of 3-(4-acryloyloxyphenyl)propionic acid in 16 g of THF, 2.04 g (18 mmol) of methanesulfonyl chloride was added, and 3.60 g (36 mmol) of triethylamine was added dropwise at 10° C. or below. After stirring for 30 minutes, 169 mg (1.4 mmol) of DMAP was added to the reaction mixture, 6.57 g (17 mmol) of the phenol derivative obtained in Step 2 dissolved in 13 g of THF was added dropwise, and the mixture was stirred for 30 minutes. The precipitate was removed by filtration and the solvent was evaporated from the filtrate. The residue was purified by column chromatography (ethyl acetate:n-hexane=1:3, $SiO_2$) and recrystallized by dissolving in chloroform and pouring to a chilled acetone-methanol (3:4) mixed solvent to yield white crystals (1.42 g, Yield: 16%). Analysis of the white crystals obtained confirmed this white crystalline substance is the desired product, Compound No. 2. The analytical results are shown below.

When a homopolymer of Compound No. 2 obtained was prepared, the polymer showed different refractive indices depending on the direction, confirming that this polymer functions as an optically anisotropic material.

(Analytical Results)

(1) IR (cm$^{-1}$) 2936, 2862, 1766, 1732, 1605, 1512, 1404, 1254, 1200, 1173, 1150, 1126, 1065, 1003

(2) NMR (ppm) 8.2 (d; 2H), 7.5-6.9 (m; 9H), 6.6-5.7 (m, 6H), 4.3-3.9 (m; 4H), 3.2-2.8 (m; 4H), 1.7-1.4 (m; 8H)

(3) Thermal phase transition behavior

Thermal phase transition behavior is shown in [Formula 71].

[Formula 71]

$$C \underset{38.2}{\overset{71.4\,(^\circ C.)}{\rightleftarrows}} N \underset{117.9}{\overset{118.8}{\rightleftarrows}} I$$

Synthesis Example 3

Synthesis of Compound No. 14

Compound No. 14 was synthesized according to the procedure of Steps 1 to 3 in the following manner.

<Step 1> Synthesis of Benzyl Ether Derivative

The following benzyl ether derivative was synthesized according to the reaction formula given by [Formula 72] in the following manner.

[Formula 72]

$$H_2C{=}CH{-}COO{-}\underset{}{\bigcirc}{-}COOH + CH_3SO_2Cl \xrightarrow[THF]{TEA}$$

$$H_2C{=}CH{-}COO{-}\underset{}{\bigcirc}{-}COOMs +$$

$$\underset{}{\bigcirc}{-}CH_2O{-}\underset{CH_3}{\bigcirc}{-}OH \xrightarrow[THF]{DMAP}$$

-continued

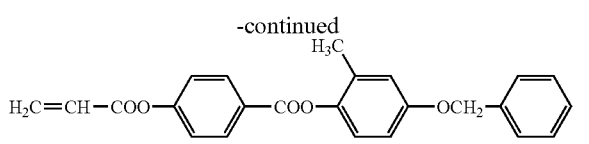

To an ice-cooled solution containing 25.00 g (130 mmol) of 4-acryloyloxybenzoic acid in 125 g of THF, 16.39 g (143 mmol) of methanesulfonyl chloride was added, and 28.96 g (286 mmol) of triethylamine was added dropwise at 10° C. or below. The mixture was stirred for 30 minutes, here were added 1.59 g (13 mmol) of DMAP, and then dropwise 29.27 g (137 mmol) of 4-benzyloxy-2-methylphenol dissolved in 150 g of THF, and the resultant mixture was stirred for 30 minutes. The precipitate was removed by filtration, the filtrate was washed with water, and the solvent was evaporated. The residue was purified by column chromatography (ethyl acetate:n-hexane=1:3, $SiO_2$) to yield the desired benzyl ether derivative as white solid (42.25 g, Yield: 84%).

<Step 2> Synthesis of Phenol Derivative

The following phenol derivative was synthesized according to the reaction formula given by [Formula 73] in the following manner.

[Formula 73]

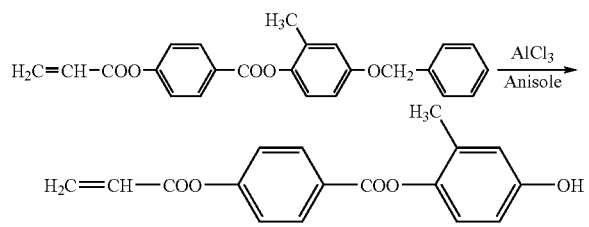

To an ice-cooled solution containing 44.96 g (337 mmol) of anhydrous aluminum chloride in 210 g of anisole, 42.25 g (109 mmol) of the benzyl ether derivative obtained in Step 1 dissolved in 210 g of anisole was added dropwise. After stirring for 30 minutes, hydrochloric acid was added drop- wise to the reaction mixture to dissolve the precipitate, and the organic layer was washed with water. The solvent was evaporated, and the residue was purified by column chromatography (ethyl acetate:toluene=1:10, $SiO_2$) to yield the desired phenol derivative as light-yellow solid (24.50 g, Yield: 75%).

<Step 3> Synthesis of Compound No. 14

Compound No. 14 was synthesized according to the reaction formula given by [Formula 74] in the following manner.

[Formula 74]

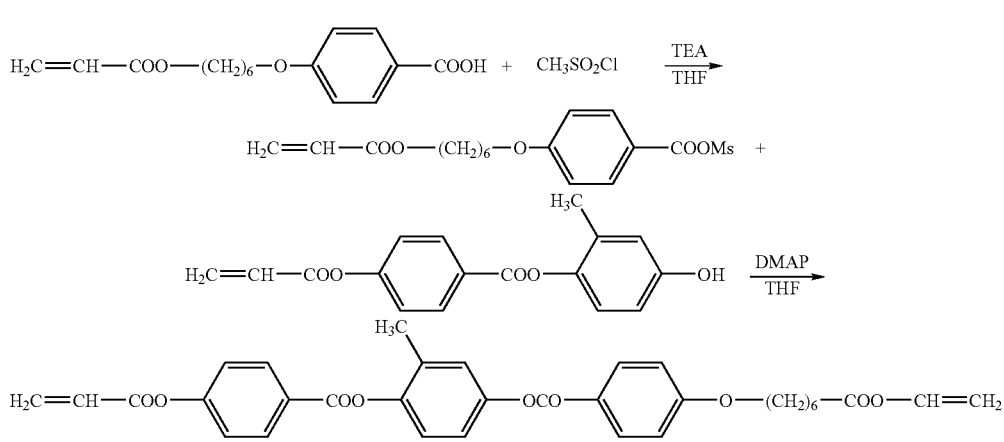

To an ice-cooled solution containing 10.00 g (34 mmol) of 4-[6-(acryloyloxy)-hexa-1-yloxy]benzoic acid in 50 g of THF, 4.70 g (41 mmol) of methanesulfonyl chloride was added, and 8.31 g (41 mmol) of triethylamine was added dropwise at 10° C. or below. After stirring for 30 minutes, 418 mg (3.4 mmol) of DMAP was added to the reaction mixture, 10.71 g of the phenol derivative obtained in Step 2 dissolved in 55 g of THF was added dropwise, and the mixture was stirred for 30 minutes. The precipitate was removed by filtration and the solvent was evaporated from the filtrate. The residue was purified by column chromatography (ethyl acetate:toluene=1:10, $SiO_2$) and recrystallized from acetone-methanol (1:2) mixed solvent to yield white powder (10.76 g, Yield: 55%). Analysis of the white powder obtained confirmed that the white powder was the desired product, Compound No. 14. The analytical results are shown below.

When a homopolymer of Compound No. 14 obtained was prepared, the polymer showed different refractive indices depending on the direction, confirming that this polymer functions as an optically anisotropic material.

(Analytical Results)

(1) IR ($cm^{-1}$) 2947, 2862, 1732, 1636, 1605, 1508, 1412, 1258, 1204, 1161, 1072, 1015

(2) $^1$H-NMR (ppm) 8.1-8.4 (m; 4H), 6.9-7.4 (m; 7H), 5.7-6.6 (m; 6H), 3.9-4.3 (m; 4H), 2.2 (s, 3H), 1.5-1.8 (m; 8H)

(3) Thermal phase transition behavior

Thermal phase transition behavior is given in [Formula 75] below.

[Formula 75]

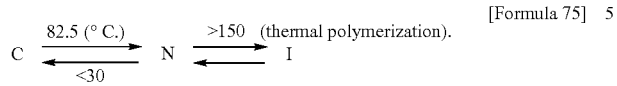

Synthesis Example 4

Synthesis of Compound No. 15

Compound No. 15 was synthesized according to the procedure of Steps 1 to 7 in the following manner.

<Step 1> Synthesis of 6-acroyloxy-2-naphthoic Acid

6-Acroyloxy-2-naphthoic acid was synthesized according to the reaction formula given by [Formula 76] in the following manner.

[Formula 76]

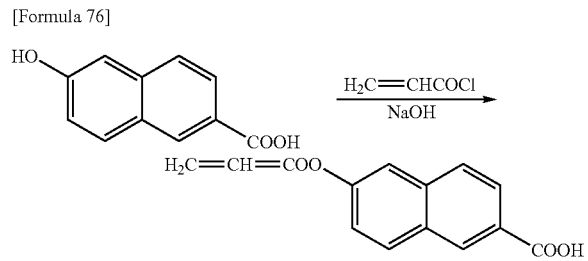

To a stirred mixture of 3.00 g (16 mmol) of 6-hydroxy-2-naphthoic acid, 40 mmol of sodium hydroxide, and 16 g of water, 1.59 g (18 mmol) of acryloyl chloride was added at 20° C., and the reaction was performed for 3 hours. After the reaction, the mixture was acidified by adding 4-mol/l hydrochloric acid dropwise and chilled with ice-water. The resultant precipitate was collected by filtration, dried in an oven at 40° C., and recrystallized from methanol-THF (2:3) mixed solvent to yield the desired product, 6-acryloyloxy-2-naphthoic acid, as while solid (2.07 g, Yield: 53.6%).

<Step 2> Synthesis of benzyloxy-2-ethylbenzene

Benzyloxy-2-ethylbenzene was synthesized according to the reaction formula given by [Formula 77] in the following manner.

[Formula 77]

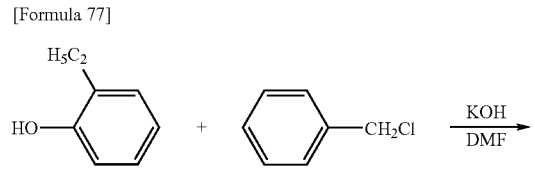

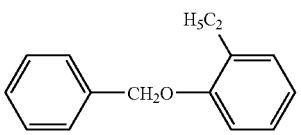

To a reactor were charged 8.77 g (71 mmol) of 2-ethylphenol, 10.00 g (79 mmol) of benzyl chloride, 8.06 g (144 mmol) of KOH, and 30 g of DMF, and the mixture was stirred at 65° C. to 85° C. for 3 hours. To this mixture, 55 g of hydrochloric acid and 50 g of toluene were added, the organic layer was washed with water, and the solvent was evaporated. The residue was purified by column chromatography (n-hexane) to yield the desired product, 1-benzyloxy-2-ethylbenzene, as colorless liquid (9.23 g, Yield: 61%).

<Step 3> Synthesis of 4-benzyloxy-3-ethylbenzaldehyde

4-Benzyloxy-3-ethylbenzaldehyde was synthesized according to the reaction formula given by [Formula 78] in the following manner.

[Formula 78]

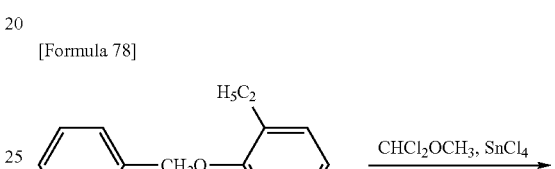

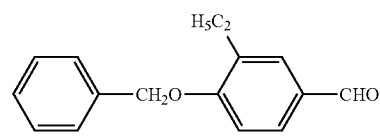

In 25 g of 1,2-dichloroethane was dissolved 3.25 g (28 mmol) of dichloromethyl methyl ether, and the solution was chilled with ice-water. Here was added dropwise 7.36 g (28 mmol) of anhydrous tin (IV) chloride, and the mixture was stirred for 10 minutes. Here was added dropwise 5.00 g (23.55 mmol) of 1-benzyloxy-2-ethylbenzene obtained in Step 2 dissolved in 1,2-dichloroethane, and the mixture was stirred at ambient temperature for 5 hours. To the reaction mixture, aqueous solution of calcium chloride was added dropwise at 20° C. or below, 15 g of hexane was added, the organic layer was washed with water, and the solvent was evaporated. The residue was purified by column chromatography (ethyl acetate:hexane=1:10, $SiO_2$) to yield the desired product, 4-benzyloxy-3-ethylbenzaldehyde, as yellow liquid (3.17 g, Yield: 56%).

<Step 4> Synthesis of 4-benzyloxy-3-ethylphenol

4-Benzyloxy-3-ethylphenol was synthesized according to the reaction formula given by [Formula 79] in the following manner.

[Formula 79]

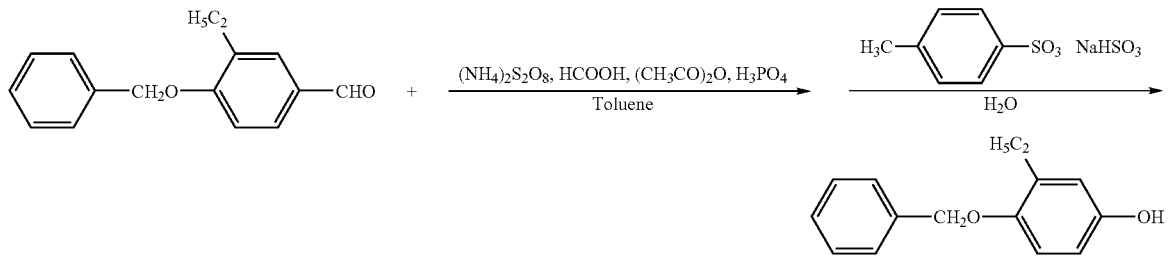

To a reactor were charged 2.50 g (10 mmol) of 4-benzyloxy-3-ethylbenzaldehyde obtained in Step 3, 3.09 g (14 mmol) of ammonium persulfate, 0.96 g (21 mmol) of formic acid, 0.40 g (4.0 mol) of acetic anhydride, and 15 g of toluene, here was added aqueous solution of phosphoric acid dropwise at 60° C., and the mixture was stirred for 20 hours. After the reaction mixture was cooled to ambient temperature, 0.094 g (0.30 mmol) of p-toluenesulfonic acid dissolved in water was added dropwise, and the mixture was stirred for 9 hours. To the reaction mixture, 20 g of saturated aqueous solution of sodium bisulfite was added, and the mixture was stirred for 30 minutes. The organic layer was washed with water, the solvent was evaporated, and the residue was purified by column chromatography (ethyl acetate:hexane=1:10, $SiO_2$) to yield the desired product, 4-benzyloxy-3-ethylphenol, as red liquid (0.92 g, Yield: 39%).

<Step 5> Synthesis of Benzyl Ether Derivative

The following benzyl ether derivative was synthesized according to the reaction formula given by [Formula 80] in the following manner.

[Formula 80]

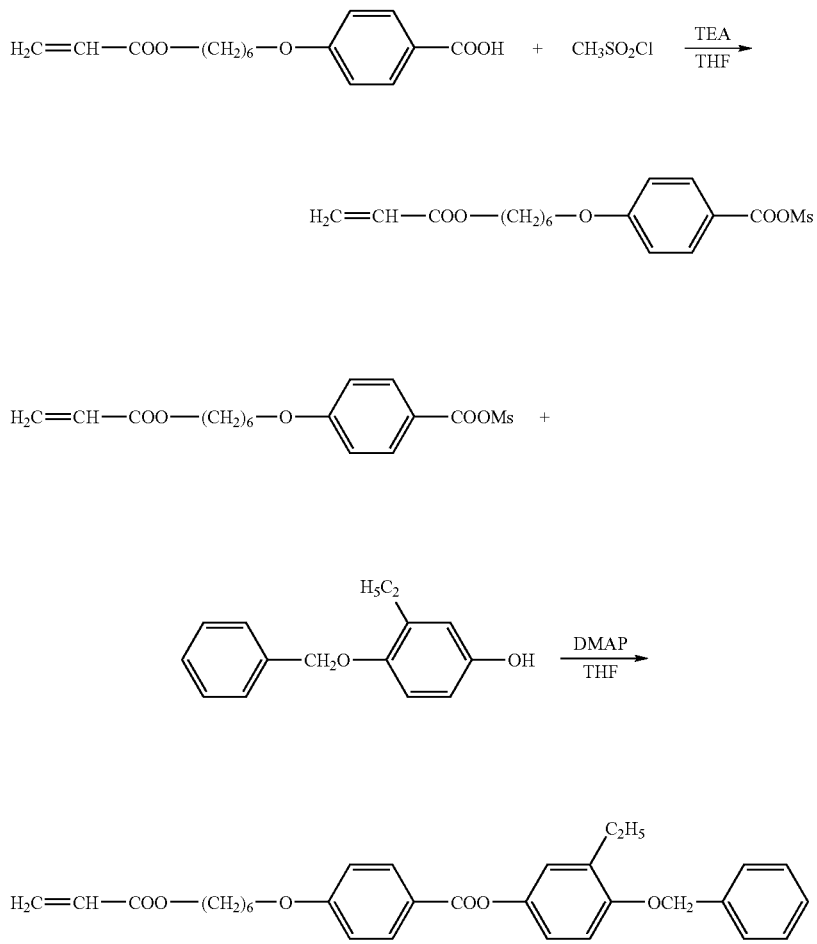

In 5 g of THF was dissolved 1.10 g (3.8 mmol) of 4-[6-(acryloyloxy)-hexa-1-yloxy]benzoic acid, and the solution was chilled to −30° C. Here were added 0.52 g (4.5 mmol) of methanesulfonyl chloride and dropwise 0.91 g (9.0 mmol) of triethylamine. After the reaction mixture was stirred for 30 minutes, here were added 46 mg (0.4 mmol) of DMAP and then dropwise 0.90 g (3.9 mmol) of 4-benzyloxy-3-ethylphenol obtained in Step 4 dissolved in 5 g of THF, and the mixture was stirred for 30 minutes. The precipitate was removed by filtration, the filtrate was washed with water, and the solvent was evaporated. The residue was purified by column chromatography (ethyl acetate:hexane=1:3, $SiO_2$) to yield the desired benzyl ether derivative as red liquid (1.94 g, Yield: 98%).

<Step 6> Synthesis of Phenol Derivative

The following phenol derivative was synthesized according to the reaction formula given by [Formula 81] in the following manner.

[Formula 81]

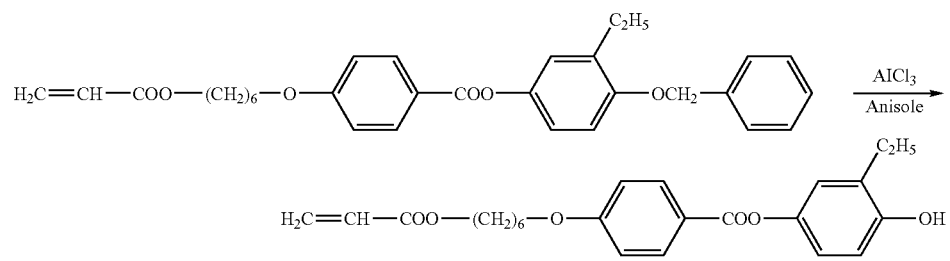

To an ice-cooled solution containing 1.60 g (12 mmol) of anhydrous aluminum chloride dissolved in 10 g of anisole, 1.94 g (3.9 mmol) of the benzyl ether derivative obtained in Step 5 dissolved in 10 g of anisole was added dropwise. After stirring for 30 minutes, hydrochloric acid was added dropwise to the reaction mixture to dissolve the precipitate, and the organic layer was washed with water. The solvent was evaporated and the residue was purified by column chromatography (ethyl acetate:toluene=1:10, $SiO_2$) to yield the desired phenol derivative as red liquid (1.22 g, Yield: 77%).

<Step 7> Synthesis of Compound No. 15

Compound No. 15 was synthesized according to the reaction formula given by [Formula 82] in the following manner.

[Formula 82]

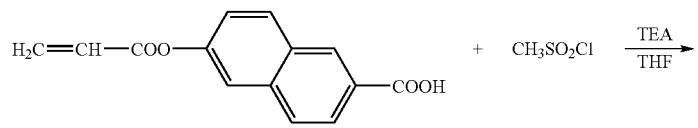

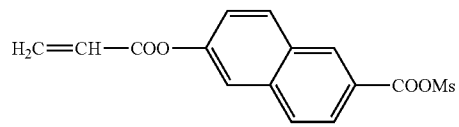

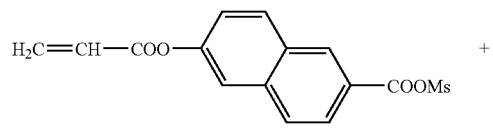

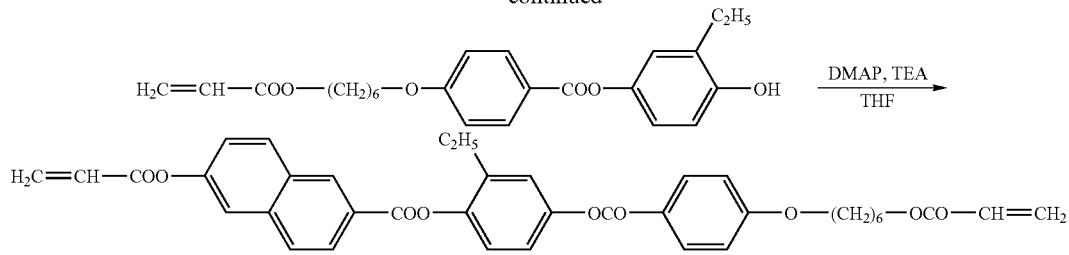

In 4 g of THF was dissolved 0.68 g (2.8 mmol) of 6-acryloyloxy-2-naphthoic acid obtained in Step 1, and the solution was chilled to −30° C. Here were added 0.38 g (3.4 mmol) of methanesulfonyl chloride, and then dropwise 0.68 g (6.8 mmol) of triethylamine. After stirring for 1 hour, 34 mg (0.3 mmol) of DMAP was added to the reaction mixture, 0.68 g of the phenol derivative obtained in Step 6 dissolved in 4 g of THF was added dropwise, and the mixture was stirred for 30 minutes. The precipitate was removed by filtration and the solvent was evaporated from the filtrate. The residue was purified by column chromatography (ethyl acetate:hexane=1:3, $SiO_2$) and then recrystallized from acetone-methanol (2:1) mixed solvent to yield white solid (0.70 g, Yield: 39%). Analysis of the white solid, obtained confirmed that the white solid was the desired product, Compound No. 15. The analytical results are given below.

When a homopolymer of Compound No. 15 obtained was prepared, the polymer showed different refractive indices depending on the direction, confirming that this polymer functions as an optically anisotropic material.

(Analytical Results)
(1) IR ($cm^{-1}$) 2947, 2869, 1736, 1631, 1608, 1581, 1512, 1492, 1473, 1447, 1408, 1280, 1253, 1188, 1165, 1080, 1007.
(2) $^1$H-NMR (ppm) 8.8 (s; 1H), 7.7-8.3 (m; 6H), 6.8-7.5 (m; 6H), 5.7-6.6 (m; 6H), 3.9-4.3 (m; 4H), 2.7 (q, 2H), 1.5-1.9 (m; 8H), 1.3 (t, 3H).
(3) Thermal phase transition behavior
Thermal phase transition behavior is shown in [Formula 83] below.

[Formula 83]

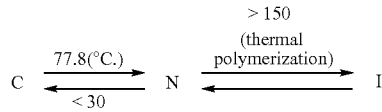

[Synthesis Example 5]

Synthesis of Compound No. 16

Compound No. 16 was synthesized according to the procedure of Steps 1 to 5 in the following manner.

<Step 1> Synthesis of 6-(6-hydroxy-hexa-1-yloxy)-2-naphthoic acid
6-(6-Hydroxy-hexa-1-yloxy)-2-naphthoic acid was synthesized according to the reaction formula given by [Formula 84] in the following manner.

[Formula 84]

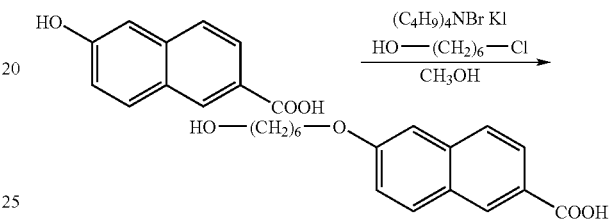

To a stirred mixture of 25.00 g (133 mmol) of 6-hydroxy-2-naphthoic acid, 2.21 g (13 mmol) of potassium iodide, 4.28 g (13 mmol) of tetrabutylammonium bromide, and 77 g of ethanol, was added dropwise 18.63 g (332 mmol) of potassium hydroxide dissolved in 38 g of water. The mixture was heated to 60° C., 19.07 g (146 mmol) of 6-chloro-1-hexanol was added dropwise here, and the solution was refluxed for 34 hours. After adding hydrochloric acid dropwise, the reaction mixture was chilled with ice-water, and the precipitate was collected by filtration. Water was added to the precipitate, and the mixture was stirred for 30 minutes and filtered to recover the precipitate, which was dried in an oven at 40° C. overnight. The dried product was recrystallized from THF to yield the desired product, 6-(6-hydroxy-hexa-1-yloxy)-2-naphthoic acid as white solid (21.63 g, Yield: 56.5%).

<Step 2> Synthesis of 6-(6-acryloyloxy-hexa-1-yloxy)-2-naphthoic acid
6-(6-Acryloyloxy-hexa-1-yloxy)-2-naphthoic acid was synthesized according to the reaction formula given by [Formula 85] in the following manner.

[Formula 85]

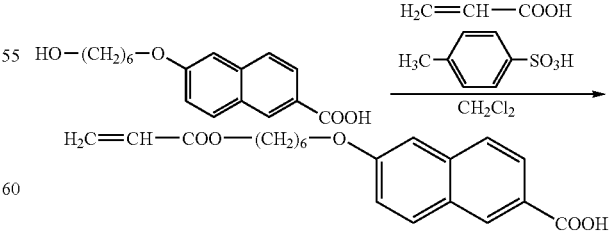

In 270 g of 1,2-dichloroethane were added 108.11 g (1.5 mmol) of acrylic acid, 21.63 g (75 mmol) of 6-(6-hydroxy-hexa-1-yloxy)-2-naphthoic acid obtained in Step 1, 4.28 g (23 mol) of p-toluenesulfonic acid monohydrate, and 0.83 g (7.5 mmol) of hydroquinone, and the solution was refluxed for 4 hours. After evaporation of the solvent, 270 g of water was added to the residue, and the precipitate was collected by filtration and dried in an oven at 40° C. overnight. The dried product was recrystallized from acetone to yield the desired product, 6-(6-acryloyloxy-hexa-1-yloxy)-2-naphthoic acid, as light-yellow powder (16.97 g, Yield: 65%).

<Step 3> Synthesis of Benzyl Ether Derivative

The following benzyl ether derivative was synthesized according to the reaction formula given by [Formula 86] in the following manner.

[Formula 86]

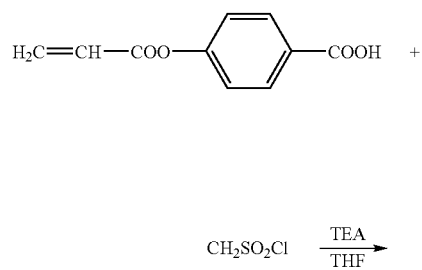

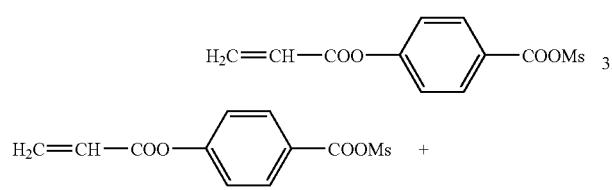

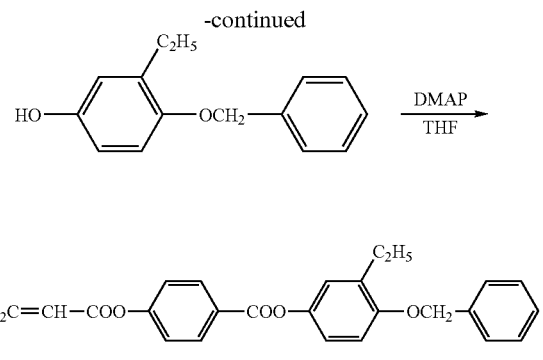

In 30 g of THF was dissolved 4.85 g (26 mmol) of 4-acryloyloxybenzoic acid, and the solution was chilled to −30° C. Here were added 3.47 g (30 mmol) of methanesulfonyl chloride and then dropwise 6.12 g (61 mmol) of triethylamine. After stirring for 1 hour, 308 mg (2.5 mmol) of DMAP was added to the reaction mixture, 6.05 g (3.9 mmol) of 4-benzyloxy-3-ethylphenol dissolved in 30 g of THF was added dropwise, and the mixture was stirred for 1 hour. The precipitate was removed by filtration, the solvent was evaporated from the filtrate, and the residue was purified by column chromatography (ethyl acetate:hexane=1:3, SiO$_2$) to yield the desired benzyl ether derivative as reddish-brown solid (8.38 g, Yield: 82.5%).

<Step 4> Synthesis of Phenol Derivative

The following phenol derivative was synthesized according to the reaction formula given by [Formula 87] in the following manner.

[Formula 87]

To an ice-cooled solution containing 9.72 g (73 mmol) of anhydrous aluminum chloride dissolved in 33 g of anisole, was added dropwise 8.38 g (21 mmol) of the benzyl ether derivative obtained in Step 3 dissolved in 33 g of anisole. After the mixture was stirred for 1 hour, hydrochloric acid was added dropwise to dissolve the precipitate, and the organic layer was washed with water. The solvent was evaporated and the residue was purified by column chromatography (ethyl acetate:toluene=1:5, SiO$_2$) to yield the desired phenol derivative as brown liquid (5.71 g, Yield: 88%).

<Step 5> Synthesis of Compound No. 16

Compound No. 16 was synthesized according to the reaction formula given by [Formula 88] in the following manner.

[Formula 88]

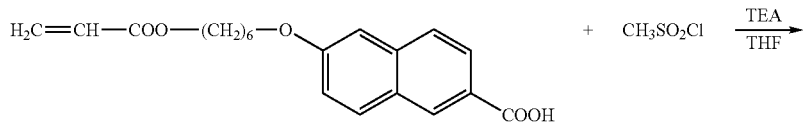

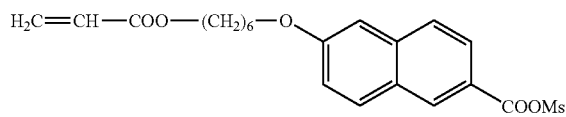

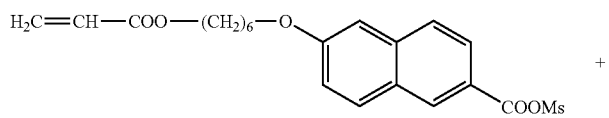

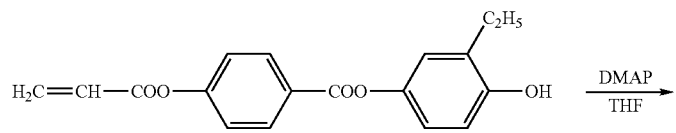

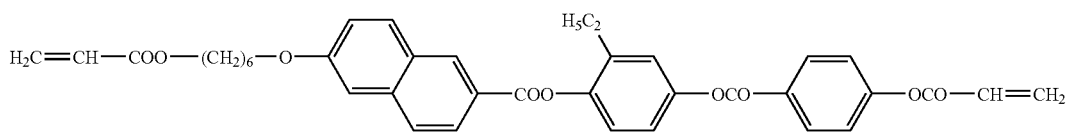

In 30 g of THF was dissolved 5.33 g (16 mmol) of 6-(6-acryloyloxy-hexa-1-yloxy)-2-naphthoic acid obtained in Step 2, the solution was chilled to −30° C. Here was added 2.14 g (19 mmol) of methanesulfonyl chloride, and 3.78 g (37 mmol) of triethylamine was further added dropwise. After the reaction mixture was stirred for 1 hour, 190 mg (1.6 mmol) of DMAP was added, 5.71 g of the phenol derivative obtained in Step 4 dissolved in 30 g of THF was added dropwise, and the mixture was stirred for 2 hours. The precipitate was removed by filtration, the filtrate was washed with water, and the solvent was evaporated. The residue was purified by column chromatography (ethyl acetate:hexane=1:3, SiO$_2$) and recrystallized from acetone-methanol (2:1) mixed solvent to yield white solid. Analysis of the white solid obtained confirmed that the white solid was the desired product, Compound No. 16. The analytical results are given below.

(Analytical Results)

(1) IR (cm$^{-1}$) 2936, 2862, 1732, 1624, 1601, 1481, 1408, 1273, 1200, 1173, 1138, 1076, 1015

(2) $^1$H-NMR (ppm) 1.2 (t; 3H), 1.5-1.8 (m; 8H), 2.6 (q; 2H), 4.0-4.3 (m; 4H), 5.7-6.7 (m; 6H), 7.2-7.4 (m; 7H), 7.8-8.3 (m; 5H), 8.7 (s; 1H)

(3) Thermal phase transition behavior

Thermal phase transition behavior is shown in [Formula 89].

[Formula 89]

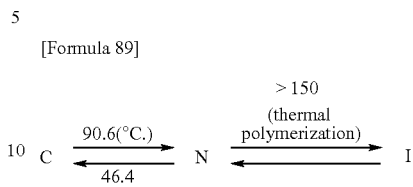

[Synthesis Example 6]

Synthesis of Compound No. 29

Compound No. 29 was synthesized according to the procedure of Steps 1 to 3 in the following manner.

<Step 1> Synthesis of Benzyl Ether Derivative

The following benzyl ether derivative was synthesized according to the reaction formula given by [Formula 90] in the following manner.

[Formula 90]

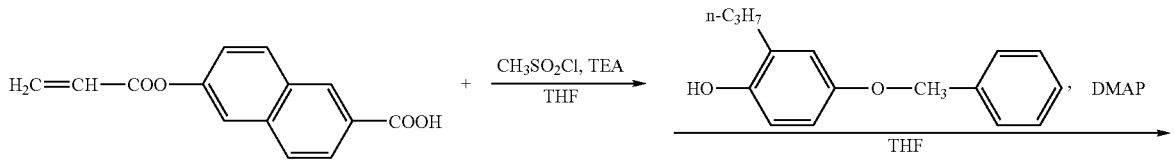

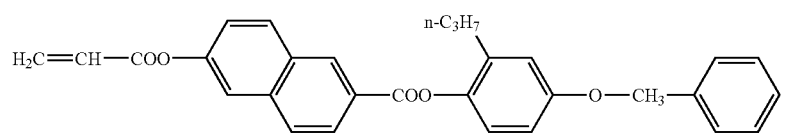

In 10 g of THF was dissolved 1.90 g (7.86 mmol) of 6-acryloyloxy-2-naphthoic acid, the solution was chilled to −30° C., here was added 0.99 g (8.65 mmol) of methanesulfonyl chloride, and 1.91 g (18.87 mmol) of triethylamine (TEA) was added dropwise. After the reaction mixture was stirred for 1 hour, 10 mg (0.08 mmol) of 4-dimethylaminopyridine (DMAP) was added, 2.00 g (8.25 mmol) of 4-benzyloxy-2-propylphenol dissolved in 7 g of THF was added dropwise, and the mixture was stirred for 1 hour. The precipitate was removed by filtration and the filtrate was washed with water, and the solvent was evaporated. The residue was purified by column chromatography (dichloromethane, $SiO_2$) and recrystallized from acetone to yield the desired benzyl ether derivative as white solid (2.27 g, Yield: 61.9%).

<Step 2> Synthesis of Phenol Derivative

The following phenol derivative was synthesized according to the reaction formula given by [Formula 91] in the following manner.

[Formula 91]

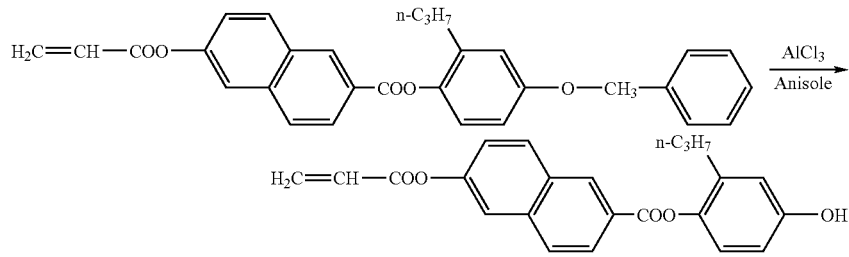

To an ice-cooled solution containing 2.01 g (15.08 mmol) of anhydrous aluminum chloride dissolved in 9 g of anisole, 2.27 g (4.87 mmol) of the benzyl ether derivative obtained in Step 1 dissolved in 9 g of anisole was added dropwise. After stirring for 1 hour, hydrochloric acid was added dropwise to the reaction mixture to dissolve the precipitate, the organic layer was washed with water, and the solvent was evaporated. The residue was purified by column chromatography (ethyl acetate:toluene=1:5, $SiO_2$) and recrystallized from acetone-methanol mixed solvent to yield the desired phenol derivative as white solid (1.20 g, Yield: 65.6%).

<Step 3> Synthesis of Compound No. 29

Compound No. 29 was synthesized according to the reaction formula given by [Formula 92] in the following manner.

[Formula 92]

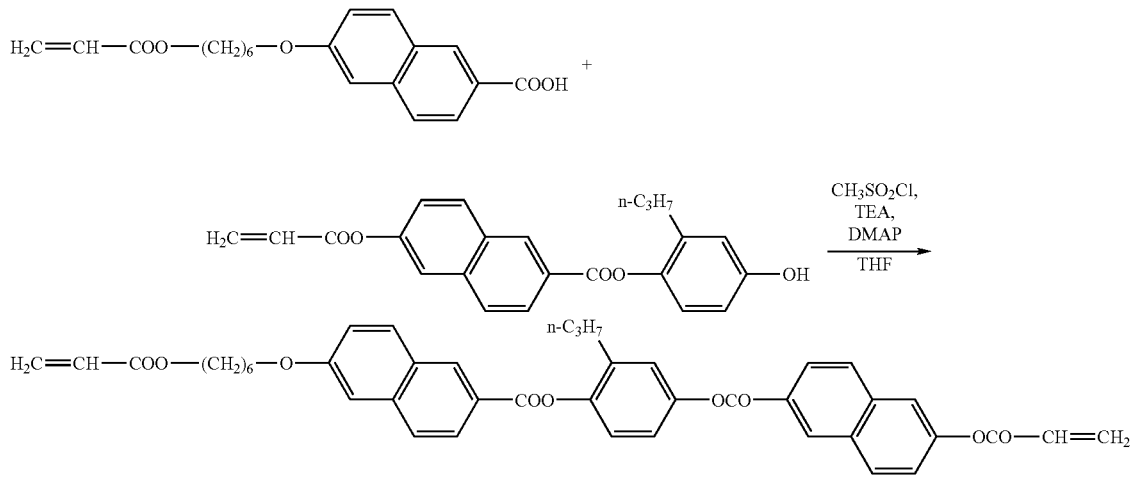

In 12 g of THF was dissolved 1.04 g (3.04 mmol) of 6-(6-acryloyloxyhexyloxy)-2-naphthoic acid and the solution was chilled to −30° C. Here was added 0.38 g (3.34 mmol) of methanesulfonyl chloride, and 0.74 g (7.29 mmol) of triethylamine was added dropwise. After the reaction mixture was stirred for 1 hour, 4 mg (0.03 mmol) of DMAP was added, 1.20 g (3.19 mmol) of the phenol derivative obtained in Step 2 dissolved in 8 g of THF was added dropwise, and the mixture was stirred for 1 hour. The precipitate was removed by filtration, the filtrate was washed with water, and the solvent was evaporated. The residue was purified by column chromatography (ethyl acetate:toluene=1:5, $SiO_2$) and recrystallized from ethyl acetate-hexane mixed solvent to yield white solid (0.67 g, Yield: 31.5%). Analysis of the white solid obtained confirmed that the white solid was the desired product, Compound No. 29. The analytical results are given below.

When a homopolymer of Compound No. 29 obtained was prepared, the polymer showed different refractive indices depending on the direction, confirming that the polymer functions as an optically anisotropic material.

(Analytical Results)

(1) IR ($cm^{-1}$) 2936, 2866, 1624, 1474, 1404, 1339, 1273, 1246, 1200, 1169, 1150, 1065, 1022

(2) $^1$H-NMR (ppm) 0.9 (t; 3H), 1.5-1.9 (m; 10H), 2.6 (q; 2H), 3.9-4.3 (m; 4H), 5.7-6.6 (m; 6H), 7.1-7.5 (m; 6H), 7.7-8.3 (m; 7H), 8.7 (s; 1H), 8.9 (s; 1H)

(3) Thermal phase transition behavior

Thermal phase transition behavior is shown in [Formula 93] below.

[Formula 93]

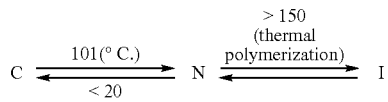

[Examples 1 to 5 and Comparative Examples 1 to 4]

Synthesis of Copolymer

Each blend was prepared by mixing the polymerizable compounds of the present invention synthesized above in Synthesis Examples 1 and 2 or synthesized by methods similar to Synthesis Examples 1 and 2 and other liquid crystalline monomers synthesized by methods similar to Synthesis Examples 1 and 2 in amounts (unit: g) in Table 1. One gram of the blend was dissolved in 5 g of dichloromethane with stirring and the solvent was evaporated to prepare a composition. To the composition obtained, 0.05 g of a photo-polymerization initiator (Irgacure 651; manufactured by Chiba Specialty Chemicals Co., Ltd.) was added, and the mixture was dissolved in 2 g of cyclohexanone. This solution prepared was applied with a spin coater to a glass plate having a rubbed oriented polyimide film, and the solvent was removed under reduced pressure at ambient temperature to form a cast film. The cast film obtained was irradiated with a mercury lamp having ultraviolet energy of 330 mJ/$cm^2$ to give a cured film (copolymer). Thickness of the cured film obtained was 0.9 to 1.2 μm as determined by a stylus method.

TABLE 1

| Compound | | Examples | | | | | Comparative Examples | | | |
|---|---|---|---|---|---|---|---|---|---|---|
| | | 1 | 2 | 3 | 4 | 5 | 1 | 2 | 3 | 4 |
| Polymerizable compounds of the present invention | No. 1 | 0.2 | 0.25 | 0.3 | 0.25 | 0.3 | | | | |
| | No. 2 | 0.2 | | | | | | | | |
| | No. 3 | | | 0.2 | 0.25 | | | | | |
| | No. 5 | 0.1 | | | | | | | | |
| | No. 6 | | 0.3 | 0.25 | 0.25 | 0.2 | | | | |
| Other liquid crystalline monomers | H-1 | | | | | | 0.3 | 0.25 | | 0.25 |
| | H-2 | | | | | | 0.1 | | 0.3 | |
| | H-4 | | 0.25 | | | | | 0.25 | 0.2 | 0.25 |
| | H-6 | 0.25 | 0.2 | | | 0.15 | 0.25 | 0.2 | 0.25 | |
| | H-7 | | | | | | | | 0.25 | 0.25 |
| | H-8 | 0.25 | | 0.25 | | | 0.25 | 0.3 | | |
| | H-9 | | | | | | 0.1 | | | |
| | H-10 | | | | 0.15 | 0.2 | | | | 0.15 |
| | H-11 | | | | 0.1 | 0.15 | | | | 0.1 |

For each of the copolymers, the phase transition temperature (transition point from N to C) before copolymerization was measured. The heat resistance of the copolymers was evaluated as follows: after kept at 150° C. for 24 hours, each copolymer was observed with a polarization microscope to rate as "Good" if the anisotropy of the refractive index was retained, "Intermediate" if it was slightly lost, or "Poor" if it was completely lost. The solvent resistance was evaluated as follows: cyclohexanone was dripped by one drop on each cured film to rate as "Good" if it showed no changes such as swelling, "Intermediate" if it was somewhat swelled, or "Poor" if the film was obviously swelled or peeled off. The results are shown in Table 2.

TABLE 2

| | Phase transition temperature (° C.) (before copolymerization) | Heat resistance | Solvent resistance |
|---|---|---|---|
| Example 1 | 14 | Good | Good |
| Example 2 | 27 | Good | Good |
| Example 3 | 20 | Good | Good |
| Example 4 | 29 | Intermediate | Intermediate |
| Example 5 | 10> | Intermediate | Intermediate |
| Comparative Example 1 | 35 | Good | Good |
| Comparative Example 2 | 46 | Good | Good |
| Comparative Example 3 | 38 | Intermediate | Intermediate |
| Comparative Example 4 | 40 | Intermediate | Intermediate |

As clearly seen in the results given in Table 2, for the copolymers of Examples 1 to 5, which were the polymers of the compositions containing the polymerizable compounds of the present invention, the temperature ranges of the liquid crystal phase were low and the cured films obtained exhibited excellent heat resistance and solvent resistance, whereas for the copolymers of Comparative Examples 1 to 4 the temperature ranges of the liquid crystal phase were high and the cured films were poor in heat resistance and solvent resistance.

Examples 6 to 9 and Comparative Examples 5 and 6

Comparison of Optical (Refractive Index) Anisotropy (Δn)

For each of the polymerizable compounds of the present invention synthesized in Synthesis Examples 3, 4, 5, and 6 above described and the liquid crystalline monomer (H-4), which was synthesized according to a similar procedure to that in Synthesis Example 3, Δn was determined. Here, Δn was calculated by extrapolating the physical properties of the composition in which each compound was added to an ester-type nematic liquid crystal in an amount of 10 mass %. The results are shown in Table 3.

TABLE 3

| | Compound | Optical (refractive index) anisotropy Δn |
|---|---|---|
| Example 6 | Compound No. 14 | 0.206 |
| Example 7 | Compound No. 15 | 0.216 |
| Example 8 | Compound No. 16 | 0.228 |
| Example 9 | Compound No. 29 | 0.246 |
| Comparative Example 5 | H-4 | 0.170 |
| Comparative Example 6 | — | 0.096 |

As clearly seen in the results given in Table 3, the polymerizable compounds of the present invention are higher in optical (refractive index) anisotropy Δn than liquid crystalline monomer in Comparative Example 5 (H-4), indicating the followings: preparation of a (co)polymer (liquid crystal material) using the polymerizable compound of the present invention as a monomer has excellent effects that a liquid crystal material in a form of a thinner film can be made and that a cholesteric liquid crystal made of the resultant (co)polymer shows wider selective reflection wavelength.

INDUSTRIAL APPLICABILITY

The polymerizable compound of the present invention can provide a composition that is polymerizable near ambient temperature and exists in a liquid crystal phase at low temperatures. The homopolymer and copolymer of the present invention are also useful as liquid crystal materials, and owing to high optical (refractive index) anisotropy (Δn) of the polymerizable compound of the present invention used as a monomer, such liquid crystal materials have advantages of applicability as thinner films and widening of selective reflection wavelength in the cholesteric liquid crystal. These polymers also have high heat resistance and high solvent resistance.

The invention claimed is:

1. A polymerizable compound, represented by a general formula below:

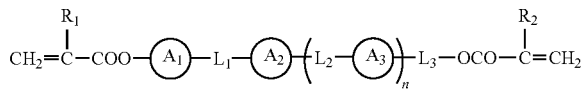

wherein each of $R_1$ and $R_2$ independently represents a hydrogen atom, methyl group, or halogen atom;

ring $A_1$ represents

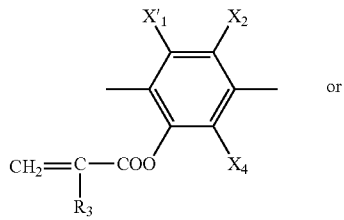

or

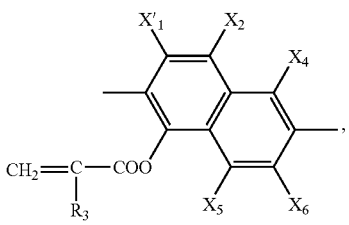

, ring $A_2$ represents

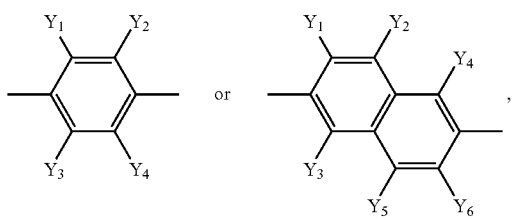

or

, ring A₃ represents

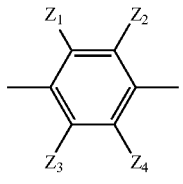 or 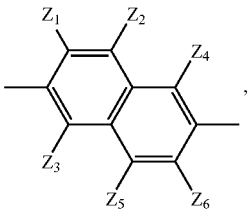, in rings A₁, A₂, and A₃ —CH= may be replaced by —N=;
R₃ represents a hydrogen atom, methyl group, or halogen atom;
$X_1'$ represents a hydrogen atom, alky group having 1 to 8 carbon atoms, alkoxy group having 1 to 8 carbon atoms, halogen atom, or cyano group;
$X_2$, $X_4$ to $X_6$, $Y_1$ to $Y_6$, and $Z_1$ to $Z_6$ independently represents a hydrogen atom, alky group having 1 to 8 carbon atoms and optionally having at least one substituent, alkoxy group having 1 to 8 carbon atoms and optionally having at least one substituent, alkenyl group having 2 to 6 carbon atoms and optionally having at least one substituent, halogen atom, or cyano group;
at least one of $X_1'$, $X_2$, $X_4$ to $X_6$, $Y_1$ to $Y_6$, and $Z_1$ to $Z_6$ is other than hydrogen;
each of $L_1$, $L_2$, and $L_3$, which are linkages, is independently a single bond, —COO—, —OCO—, —(CH₂)_d—, —CH=CH—, —(CH₂)_e O—, —O(CH₂)_f—, —O(CH₂)_g O—, —OCOO(CH₂)_h—, —(CH₂)_i OCOO—, —(CH₂)_j O(CH₂)_k—, —O(CH₂)_l—[Si (CH₃)₂ O]_m—Si(CH₃)₂(CH₂)_o—, —(OCH₂CH₂)_p—, —(CH₂CH₂O)_q—, —(OCH₂CH(CH₃))_r—, —(CH (CH₃)CH₂)_s—, —CH=CHCH₂O—, —OCH₂CH=CH—, —CH=CH—COO—, —OCO—CH=CH—, —C≡C—, —(CH₂)₂COO—, —OCO(CH₂)₂—, —CF=CF—, —OCF₂—, —CF₂O—, —C≡C—COO—, —OCO—C≡C—, or —O—, in which part of the carbon atoms may be silicon atoms;
each of d to m and o independently represents an integer of 1 to 8;
each of p to s independently represents an integer of 1 to 3; and
n represents 0 or 1.

2. A polymerizable compound, represented by a general formula below:

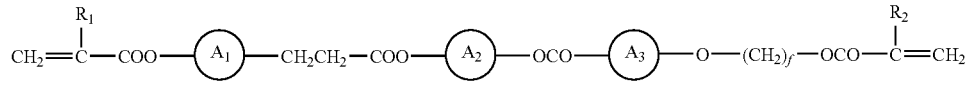

wherein each of $R_1$ and $R_2$ independently represents a hydrogen atom, methyl group, or halogen atom;
ring A₁ represents

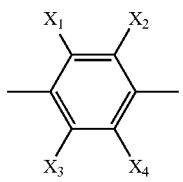 or 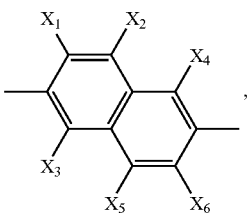, ring A₂ represents

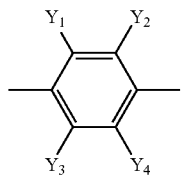 or 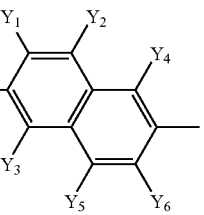

ring A₃ represents

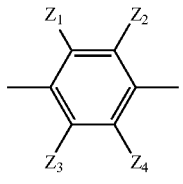 or 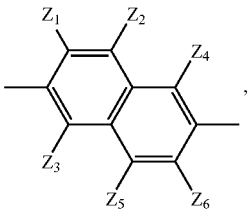, in rings A₁, A₂, and A₃ —CH= may be replaced by —N=;
$X_1'$ and $X_3'$ independently represent a hydrogen atom, alkyl group having 1 to 8 carbon atoms, alkoxy group having 1 to 8 carbon atoms, alkenyl group having 2 to 6 carbon atoms and optionally having at least one substituent, halogen atom, or cyano group;

each of $X_2$, $X_4$ to $X_6$, $Y_1$ to $Y_6$, and $Z_1$ to $Z_6$ independently represents a hydrogen atom, alkyl group having 1 to 8 carbon atoms and optionally having at least one substituent, alkoxy group having 1 to 8 carbon atoms and optionally having at least one substituent, alkenyl group having 2 to 6 carbon atoms and optionally having at least one substituent, halogen atom, or cyano group;

at least one of $X_1'$, $X_3'$, $X_2$, $X_4$ to $X_6$, $Y_1$ to $Y_6$, and $Z_1$ to $Z_6$ is other than hydrogen;

f represents an integer of 1 to 8.

3. A polymerizable compound, represented by a general formula below:

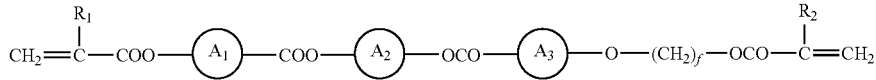

wherein each of $R_1$ and $R_2$ independently represents a hydrogen atom, methyl group, or halogen atom;

ring $A_1$ represents

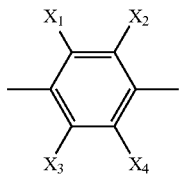 or 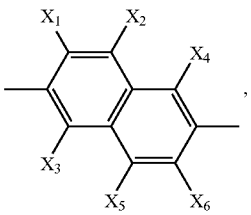, ring $A_2$ represents

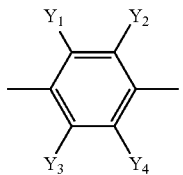 or 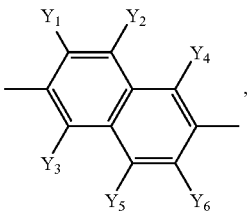, ring $A_3$ represents

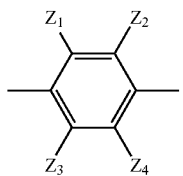 or 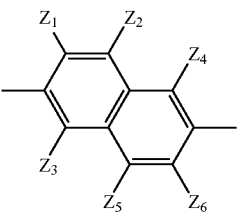, in rings $A_1$, $A_2$, and $A_3$ —CH= may be replaced by —N=;
$X_1'$ and $X_3'$ independently represent a hydrogen atom, alkyl group having 1 to 8 carbon atoms, alkoxy group having 1 to 8 carbon atoms, alkenyl group having 2 to 6 carbon atoms and optionally having at least one substituent, halogen atom, or cyano group; each of $X_2$, $X_4$ to $X_6$, $Y_1$ to $Y_6$, and $Z_1$ to $Z_6$ independently represents a hydrogen atom, alkyl group having 1 to 8 carbon atoms and optionally having at least one substituent, alkoxy group having 1 to 8 carbon atoms and optionally having at least one substituent, alkenyl group having 2 to 6 carbon atoms and optionally having at least one substituent, halogen atom, or cyano group;
at least one of $X_1'$, $X_3'$, $X_2$, $X_4$ to $X_6$, $Y_1$ to $Y_6$, and $Z_1$ to $Z_6$ is other than hydrogen;
f represents an integer of 1 to 8.

4. The polymerizable compound according to claim 1, represented by a general formula below:

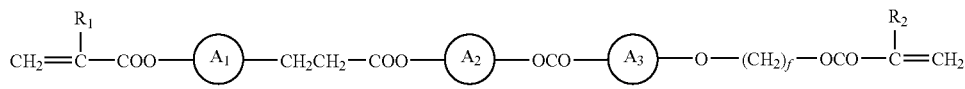

wherein $R_1$, $R_2$, $A_1$, $A_2$, $A_3$ and f are as defined in claim 1.

5. The polymerizable compound according to claim 1, represented by a general formula below:

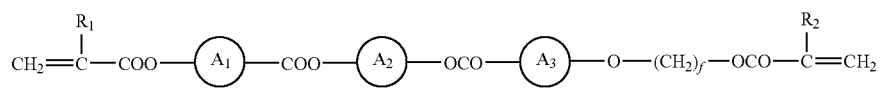

wherein $R_1$, $R_2$, $A_1$, $A_2$, $A_3$ and f are as defined in claim 1.

6. A polymerizable compound, represented by a general formula below:

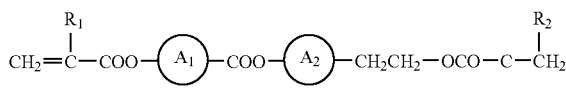

wherein each of $R_1$ and $R_2$ independently represents a hydrogen atom, methyl group, or halogen atom;

ring $A_1$ represents

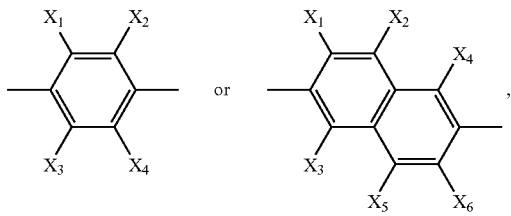

ring $A_2$ represents

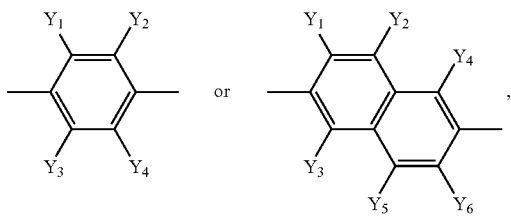

in rings $A_1$ and $A_2$ —CH= may be replaced by —N=;

$X_1'$ and $X_3'$ independently represent a hydrogen atom, alkyl group having 1 to 8 carbon atoms, alkoxy group having 1 to 8 carbon atoms, alkenyl group having 2 to 6 carbon atoms and optionally having at least one substituent, halogen atom, or cyano group; each of $X_2$, $X_4$ to $X_6$, and $Y_1$ to $Y_6$, independently represents a hydrogen atom, alkyl group having 1 to 8 carbon atoms and optionally having, at least one substituent, alkoxy group having 1 to 8 carbon atoms and optionally having at least one substituent, alkenyl group having 2 to 6 carbon atoms and optionally having at least one substituent, halogen atom, or cyano group; at least one of $X_1'$, $X_3'$, $X_2$, $X_4$ to $X_6$, and $Y_1$ to $Y_6$, is other than hydrogen.

7. A (co)polymer obtained by (co)polymerizing the polymerizable compound according to claim 1.

8. A (co)polymer obtained by (co)polymerizing the polymerizable compound according to claim 2.

9. A (co)polymer obtained by (co)polymerizing the polymerizable compound according to claim 3.

10. A (co)polymer obtained by (co)polymerizing the polymerizable compound according to claim 6.

11. A copolymer obtained by copolymerizing the polymerizable compound according to claim 1 with at least one other compound having an ethylenic unsaturated bond.

12. A copolymer obtained by copolymerizing the polymerizable compound according to claim 2 with at least one other compound having an ethylenic unsaturated bond.

13. A copolymer obtained by copolymerizing the polymerizable compound according to claim 3 with at least one other compound having an ethylenic unsaturated bond.

14. A copolymer obtained by copolymerizing the polymerizable compound according to claim 6 with at least one other compound having an ethylenic unsaturated bond.

15. A copolymer obtained by copolymerizing the polymerizable compound according to claim 1 with at least one other monomer having an optically active group.

16. A copolymer obtained by copolymerizing the polymerizable compound according to claim 2 with at least one other monomer having an optically active group.

17. A copolymer obtained by copolymerizing the polymerizable compound according to claim 3 with at least one other monomer having an optically active group.

18. A copolymer obtained, by copolymerizing the polymerizable compound according to claim 6 with at least one other monomer having an optically active group.

19. A composition containing the polymerizable compound according to claim 1.

20. A composition containing the polymerizable compound according to claim 2.

21. A composition containing the polymerizable compound according to claim 3.

22. A composition containing the polymerizable compound according to claim 6.

23. An optically anisotropic material formed from the (co)polymer according to claim 7.

24. An optically anisotropic material formed from the (co)polymer according to claim 8.

25. An optically anisotropic material formed from the (co)polymer according to claim 9.

26. An optically anisotropic material formed from the (co)polymer according to claim 10.

* * * * *